(12) United States Patent
Olafsson et al.

(10) Patent No.: US 11,983,714 B2
(45) Date of Patent: May 14, 2024

(54) SYSTEM, METHOD, AND APPARATUS FOR DOWNLOADING CONTENT DIRECTLY INTO A WEARABLE DEVICE

(71) Applicant: Onanoff Limited Company (Ltd.), Kowloon Bay (HK)

(72) Inventors: Petur Hannes Olafsson, Hong Kong (CN); Simon Weston, Miyagi-ken (JP); Charles R. Watson, Christchurch (NZ)

( * ) Notice: Subject to any disclaimer, the term of this patent is extended or adjusted under 35 U.S.C. 154(b) by 0 days.

(21) Appl. No.: 18/117,578

(22) Filed: Mar. 6, 2023

(65) Prior Publication Data
US 2023/0206232 A1    Jun. 29, 2023

Related U.S. Application Data

(63) Continuation-in-part of application No. 17/492,907, filed on Oct. 4, 2021, now Pat. No. 11,599,146.

(60) Provisional application No. 63/189,451, filed on May 17, 2021, provisional application No. 63/087,627, filed on Oct. 5, 2020.

(51) Int. Cl.
*G06Q 20/40* (2012.01)
*G06K 7/10* (2006.01)

(52) U.S. Cl.
CPC ....... *G06Q 20/401* (2013.01); *G06K 7/10396* (2013.01); *G06Q 2220/18* (2013.01)

(58) Field of Classification Search
None
See application file for complete search history.

(56) References Cited

U.S. PATENT DOCUMENTS

| | | | | |
|---|---|---|---|---|
| 5,260,711 | A * | 11/1993 | Sterzer | H01Q 3/22 342/375 |
| 8,160,495 | B2 * | 4/2012 | Khedouri | G06F 16/4387 713/168 |
| 2016/0370606 | A1 * | 12/2016 | Huynh | G02C 11/10 |
| 2018/0167549 | A1 * | 6/2018 | Lim | G06F 1/163 |
| 2019/0182371 | A1 * | 6/2019 | Ashall | H04M 1/72469 |
| 2019/0311335 | A1 * | 10/2019 | Greiner | G06F 21/121 |

* cited by examiner

*Primary Examiner* — Joseph H Feild
*Assistant Examiner* — Pameshanand Mahase
(74) *Attorney, Agent, or Firm* — Gearhart Law LLC; David Postolski

(57) ABSTRACT

A system for sharing copyrighted digital content, including a first device configured to be worn by a user, the first device comprising an index system to manage digital content stored on, streamed to, or transmitted to the first device. At least one mechanism is included for sensory playback of the digital content. At least one mechanism is included for forming a wireless local network with at least one second device. In embodiments, an active RFID reader is also included, for use with an object containing a passive RFID tag. The RFID tag functions to perform at least one of: authorize use of the digital content by the first device; act as an index decision node input; authorize the first device and the at least one second device to form the wireless local network; and authorize use of mechanical and software features and functions of the first device.

19 Claims, 56 Drawing Sheets

SYSTEM, METHOD, AND APPARATUS FOR DOWNLOADING CONTENT DIRECTLY INTO A WEARABLE DEVICE

This application is a U.S. CIP application claiming priority to U.S. Non-Provisional patent application Ser. No. 17/492,907 filed Oct. 4, 2021, which claims priority to U.S. Provisional Patent Application Ser. No. 63/087,627 filed on Oct. 5, 2020 and to U.S. Provisional Patent Application Ser. No. 63/189,451 filed on May 17, 2021, the contents of all of which are hereby incorporated by reference in their entirety.

FIELD

The field of the invention and its embodiments relate to a system, a method, and an apparatus for the secure management of digital content to a plurality of devices, each of the devices utilizing a respective object associated with a corresponding device to provide for a shared playback experience of the devices' digital content while addressing commercial concerns regarding digital content distribution and copyright.

BACKGROUND

MP3 players can play a piece of music from information stored in the MP3 player without the use of a CD. Specifically, MP3 is a coding format for digital audio. However, MP3 players are not child-friendly, due to the associated risk of damage by dropping such device. Additionally, such MP3 players are difficult and confusing for children to use. Furthermore, for such devices, it becomes difficult to protect the rights associated with the digital content streamed from or downloaded from the Internet. Thus, what is needed is a child-friendly system for the secure management of the supply of digital content to a wearable device from a server.

Examples of Related Art Include:

U.S. Pat. No. 8,160,495 B2 describes a portable wireless communications subscriber audio and/or video player apparatus and system and method for selecting, requesting, downloading, and playing audio and/or video data content files from an Internet-based database server. The wireless link is preferably implemented in accordance with the WIFI protocol, which allows connectivity to the Internet by being in proximity with a local base station or WIFI hotspot (i.e., publicly available local wireless access hub connected to the Internet). The portable wireless communications subscriber audio and/or video player apparatus and system preferably include a security means for monitoring and blocking unauthorized use of the player apparatus and system. The player apparatus further preferably has the capability to communicate with other neighboring player apparatus for the purpose of exchanging content data files, playlists and personal messages.

U.S. Pat. No. 7,770,226 B2 describes a method and system of synchronizing data between a contents providing system and a portable device via network.

U.S. Pat. No. 10,721,550 B2 describes systems and methods of detecting headphone rotation to properly process user input to the headphones.

WO 2017/129349 A1, WO 2015/104222 A1, DE 102014000075 A1, and U.S. Design Pat. No. 0822640 S describe a toy for playing back music or a narrated story. The toy includes a loudspeaker or a loudspeaker terminal, a sensor that can detect, within an area in the surroundings of the sensor, a property or a change in a property of said surroundings, and a control unit that can actuate the loudspeaker or the loudspeaker terminal to play back music or a narrated story when the sensor senses, within the area in the surroundings of the sensor, a certain property or a certain change in a property of the surroundings or when the control unit detects a certain change in the property sensed by the sensor. Toy identification and a device for transmitting a signal that is dependent of the toy identification are also provided by these references.

WO 2006/048668 A1 describes a computerized teaching apparatus comprises: a plurality of items (9), a reader (15) and a computer (1). Each item (9) comprises a computer-readable medium arranged to store data that corresponds to a physical attribute of the item. The reader (15) is arranged to generate input signals, each input signal representing the data stored on the computer-readable medium of one item (9). The computer (1) is programmed to receive the plurality of input signals sequentially. The computer is further arranged to generate, in response to a detection of a stored predetermined combination of input signals, an output signal representative of that combination.

U.S. Pat. No. 8,287,327 B1 describes an interactive intelligent play set, method, and apparatus that include a principle toy, a plurality of action figures, and/or play accessories. An intelligent play set identifies and tracks action figures and/or play accessories used by a player during a play session, provides interactions based on the specific action figures, accessories, or combinations thereof, used by a player during game play, provides interactions based on the history of how a player has interacted with the set during previous play sessions, and/or enables a player to construct new interactions between the various play pieces of the play set, using basic interactions as building blocks.

U.S. Published Patent Application No. 2008/0153594 A1 describes an entertainment system that comprises at least one handheld controller with a plurality of accelerometers and a touch screen interface. The system further includes a base station and an accessory box. The base station routs signals containing data and information from the handheld controllers and the accessory box to a computing apparatus that is in communication with a game portal residing on a server on a network. Game play is enabled by the server on the entertainment system.

WO 2006/058204 A3 describes an electronic game board (18) for use in a DVD gaming system (10) that includes: a DVD player (12), where DVD media (14) incorporating commands and audio visual content is accessed by the DVD player (12) as part of game play. The electronic board (12) may be used with play piece (34) and may be configured to determine the identity and location of a play piece (34) on the electronic board (18), to wirelessly transmit location data to the DVD player (12), to determine the location of finger contact on the board surface instead of play piece location, and to receive transmissions from the DVD player. The board (18) may include command inputs such as buttons, switches, or joysticks to be used as part of game play. The board (18) may include a display for presenting information or pictures to players. The board (18) may overlay displaying different playing surfaces and playing spaces.

U.S. Pat. No. 10,362,399 B1 describes systems and methods of detecting headphone orientation.

U.S. Published Patent Application No. 2006/0123053 describes a personalized content system that enables a user with a communications device to convert and/or passively receive pre-selected content from multiple resources.

U.S. Pat. No. 9,009,594 B2 describes content gestures. In examples, one or more controls are output to control output of content and for display in a user interface by a computing device. An input is recognized, by the computing device, which was detected using a camera as a gesture to interact with a particular one of the controls to control the output of the content.

U.S. Pat. No. 10,068,568 B2 describes systems, devices and methods for segmentation of content. In one aspect, a method may include receiving content associated with speech, text, or closed captioning data. The speech, the text, or the closed captioning data may be analyzed to derive at least one of a topic, subject, or event for at least a portion of the content. The content may be divided into two or more content segments based on the analyzing. At least one of the topic, the subject, or the event may be associated with at least one of the two or more content segments based on the analyzing. At least one of the two or more content segments may then be published such that each of the two or more content segments is individually accessible.

TWM599457U describes a wearable device that changes the rhythm of music based on data received from sensors of the wearable device.

U.S. Pat. No. 10,133,900 B2 describes a method for controlling the output of contextual information to assist a user in performing a sequence of activities using a computing device. The computing device includes or is coupled to at least one wearable sensor and at least one output device for providing contextual information. The method includes numerous process steps, such as: identifying, using sensor information from the at least one sensor, an activity being performed by the user; and selecting and controlling the output of contextual information based on the activity being performed by the user. The contextual information is being output from the at least one output device to a user to assist the user in performing the identified activity.

U.S. Published Patent Application No. 2013/0226930 A1 describes a method for indexing multimedia content. The method includes numerous process steps, such as: segmenting the multimedia content, by a computer, into a plurality of segments; identifying, by a computer, for each segment, one or more features present in the segment, where the features are of respective media types; identifying, by a computer, for each identified feature in each segment, one or more respective keywords associated the identified feature; and determining, by a computer, for each identified keyword associated with an identified feature in a given segment, a respective relevance of the keyword to the given segment, where the respective relevance is dependent on a weight associated with the respective media type of the identified feature.

U.S. Published Patent Application No. 2008/0165141 A1 describes a system, method, and software for implementing gestures with touch sensitive devices for managing and editing media files on a computing device or system. Specifically, gestural inputs of a human hand over a touch/proximity sensitive device can be used to control, edit, and manipulate files, such as media files including without limitation graphical files, photo files and video files.

U.S. Published Patent Application No. 2009/0251244 A1 describes an improved field emission system and method that involves field emission structures having electric or magnetic field sources. The magnitudes, polarities, and positions of the magnetic or electric field sources are configured to have desirable correlation properties, which may be in accordance with a code. The correlation properties correspond to a desired spatial force function where spatial forces between field emission structures correspond to relative alignment, separation distance, and the spatial force function.

Some similar devices exist in the art. However, their means of operation are substantially different from the present disclosure, as the other inventions fail to solve all the problems taught by the present disclosure.

SUMMARY

The present invention and its embodiments relate to a system, a method, and an apparatus for the secure management of the supply of digital content to a device worn on a body of a user, the device utilizing an object in association with the device in such a manner as to enhance the experience of the device content playback, while addressing commercial concerns of digital content distribution and copyright.

A first embodiment of the present invention describes a system. The system includes a cloud backend, a cloud web portal, an object, and a wearable device configured to be worn by a user. The wearable device includes a receiving portion configured to detect receipt of the object and one or more speakers. The wearable device may comprise headphones, a virtual reality (VR) headset, an augmented reality headset, or a mixed reality headset, among other wearable devices not explicitly described herein.

In a first example, the object comprises a first set of magnets and a radio frequency identification (RFID) passive tag. In this example, the receiving portion of the wearable device comprises a second set of magnets, an active RFID reader, and a Hall sensor. When the object is received by the receiving portion of the wearable device, the first set of magnets engages the second set of magnets via a magnetic connection to affix the object to the receiving portion of the wearable device. Moreover, when the object is received by the receiving portion of the wearable device, the first set of magnets of the object activates the Hall sensor of the wearable device. In turn, the Hall sensor activates a read cycle of the active RFID reader in the receiving portion of the wearable device. Moreover, activation of the read cycle of the active RFID reader of the receiving portion of the wearable device comprises detection of an identifier and a security code associated with digital content from the RFID passive tag of the object.

In some examples, the object is received by and affixed to the receiving portion of the wearable device via a mechanical means. In a further example, the receiving portion of the wearable device comprises a light sensor comprising a photodiode and an optical sensory array comprising one or more photo-elements. In response to the object being received by the receiving portion of the wearable device, the light sensor of the receiving portion of the wearable device is covered by the object to trigger a handshake to detect an identifier and a security code associated with digital content of the object.

In an additional example, the object comprises electronic circuitry and a means to store an identifier and a security code associated with digital content. In response to the object being received by the receiving portion of the wearable device, a circuit in the wearable device is closed, allowing an identifier and a security code associated with digital content to be transferred to the wearable device.

In a further example, each of the wearable device and the object comprises an electronic circuit. When the object is received by the receiving portion of the wearable device, an identifier and a security code associated with digital content are transferred to the wearable device.

In another example, a user utilizes an application executable on a computing device to create a user account via the cloud web portal. The cloud backend is configured to: verify that the wearable device is associated with the user account and confirm a purchase of digital content of the object.

A second embodiment of the present invention describes a system. The system includes an object, a wearable device, a cloud web portal, and a cloud backend. The wearable device is configured to be worn by a user. The wearable device includes a receiving portion configured to detect receipt of the object and one or more speakers. The cloud web portal is configured to receive account information associated with a user. The cloud backend is configured to verify that the wearable device is associated with the user account and confirm a purchase of digital content of the object.

In some examples, the object includes a first set of magnets and an RFID passive tag. The receiving portion of the wearable device comprises a second set of magnets, an active RFID reader, and a Hall sensor. When the object is received by the receiving portion of the wearable device, the first set of magnets engages the second set of magnets via a magnetic connection to affix the object to the receiving portion of the wearable device. In some examples, when the object is received by the receiving portion of the wearable device, the first set of magnets of the object activates the Hall sensor of the wearable device. Moreover, the Hall sensor activates a read cycle of the active RFID reader in the receiving portion of the wearable device. Additionally, activation of the read cycle of the active RFID reader of the receiving portion of the wearable device comprises detection of an identifier and a security code associated with digital content from the RFID passive tag of the object.

In other examples, the receiving portion of the wearable device comprises: a light sensor comprising a photodiode, and an optical sensory array comprising one or more photoelements. In response to the object being received by the receiving portion of the wearable device, the light sensor of the receiving portion of the wearable device is covered by the object to trigger a handshake to detect an identifier and a security code associated with digital content of the object.

A third embodiment of the present invention describes a method for downloading content into a wearable device. The method includes numerous process steps, such as: utilizing an application executable on a computing device to create a user account via a web portal, affixing an object to a receiving portion of a wearable device, detecting the object by the receiving portion of the wearable device, reading tag data of the object, verifying that the wearable device is associated with the user account, confirming a purchase of the digital content of the object, and utilizing the tag data to interact with a cloud backend to download the digital content.

It should be appreciated that in the embodiments disclosed herein, a wired, wireless, and/or a touch connection method or technology may be used. Example wireless connection methods include a Bluetooth connection, a radio broadcast connection, a mesh system, an Ultra-wideband (UWB) connection or a Wi-Fi connection, among others not explicitly described herein. Furthermore, touch connection mechanisms or methods include galvanic or capacitive coupling methods that occur by skin contact or another mechanism. Additionally, one or more connection methods or means described herein may operate simultaneously.

In general, the present invention succeeds in conferring the following benefits and objectives.

It is an object of the present invention to provide a wearable device that can download digital content from a server or other source, and store and playback digital content or stream digital content from the server.

It is an object of the present invention to provide a child-friendly wearable device.

It is an object of the present invention to provide a child-friendly system for the secure management of the supply of digital content, including copyrighted content, to a wearable device.

DETAILED DESCRIPTION

Figure 1:
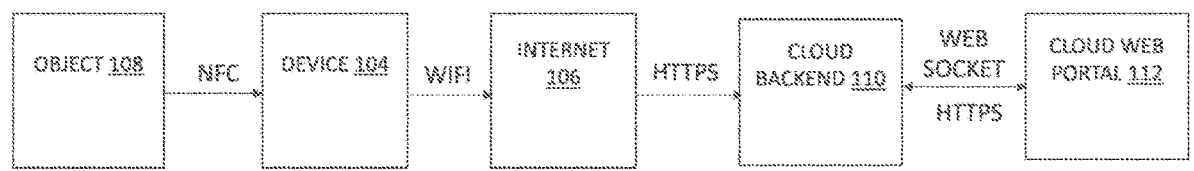
FIG. 1 depicts a block diagram of cloud solution architecture of a system, according to at least some embodiments disclosed herein.

Example embodiments of the present invention will now be described with reference to the drawings, in which identical elements are identified with the same reference numerals. These embodiments are provided by way of explanation of the present invention, which is not intended to be limited thereto. In fact, those of ordinary skill in the art may appreciate upon reading the present specification and viewing the present drawings that various modifications and variations can be made thereto.

Figure 3:
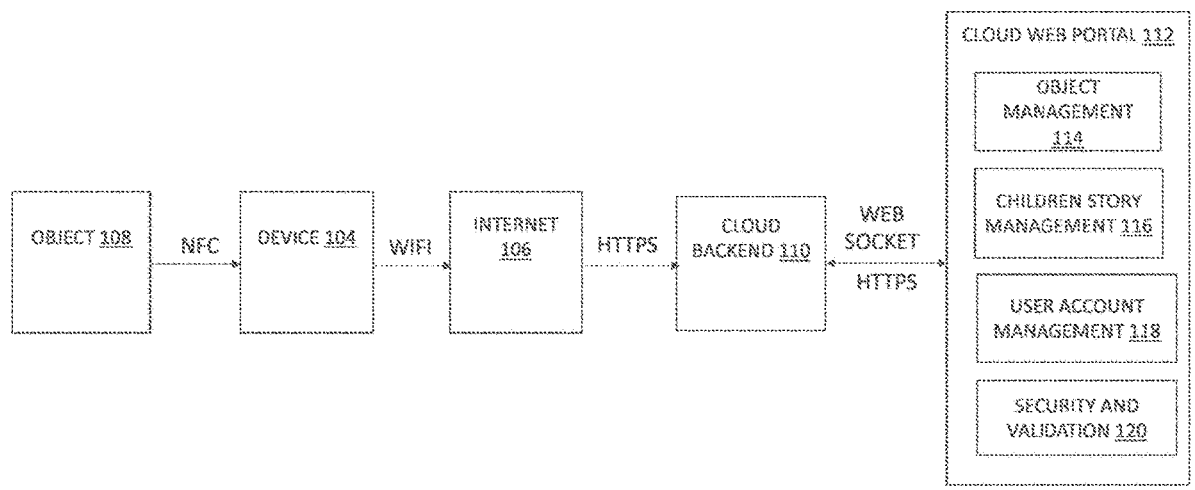
FIG. 3 depicts a block diagram of cloud solution architecture of a system, according to at least some embodiments disclosed herein.
Figure 4:
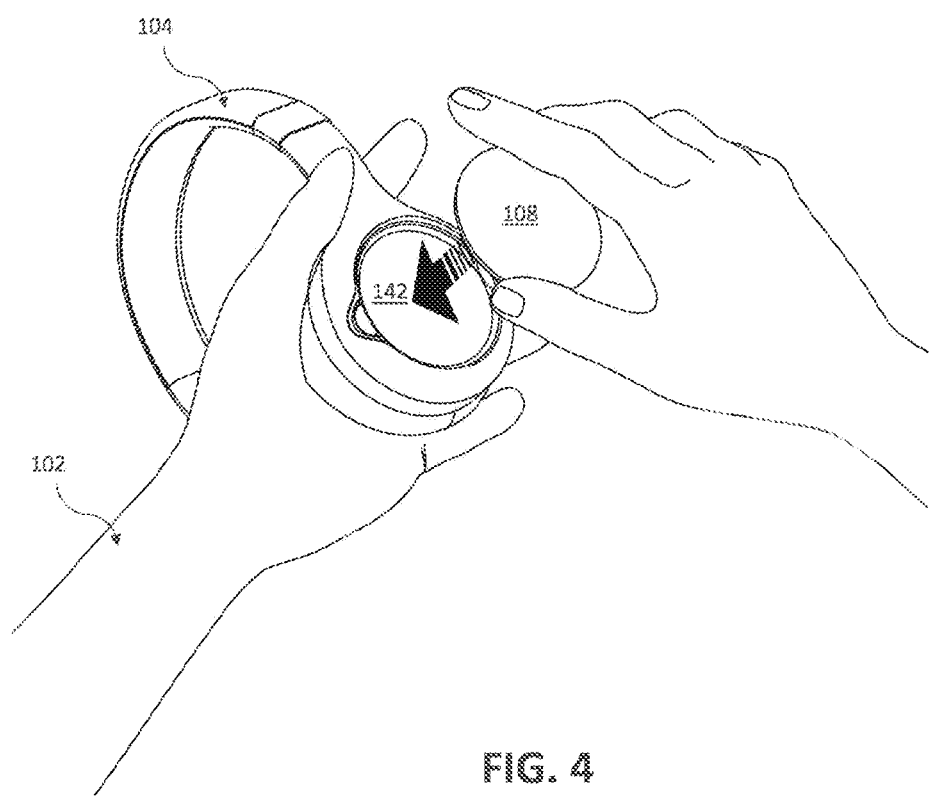
FIG. 4 depicts a perspective view of a schematic diagram depicting an object being affixed to a receiving portion of a wearable device, according to at least some embodiments disclosed herein.
Figure 5:
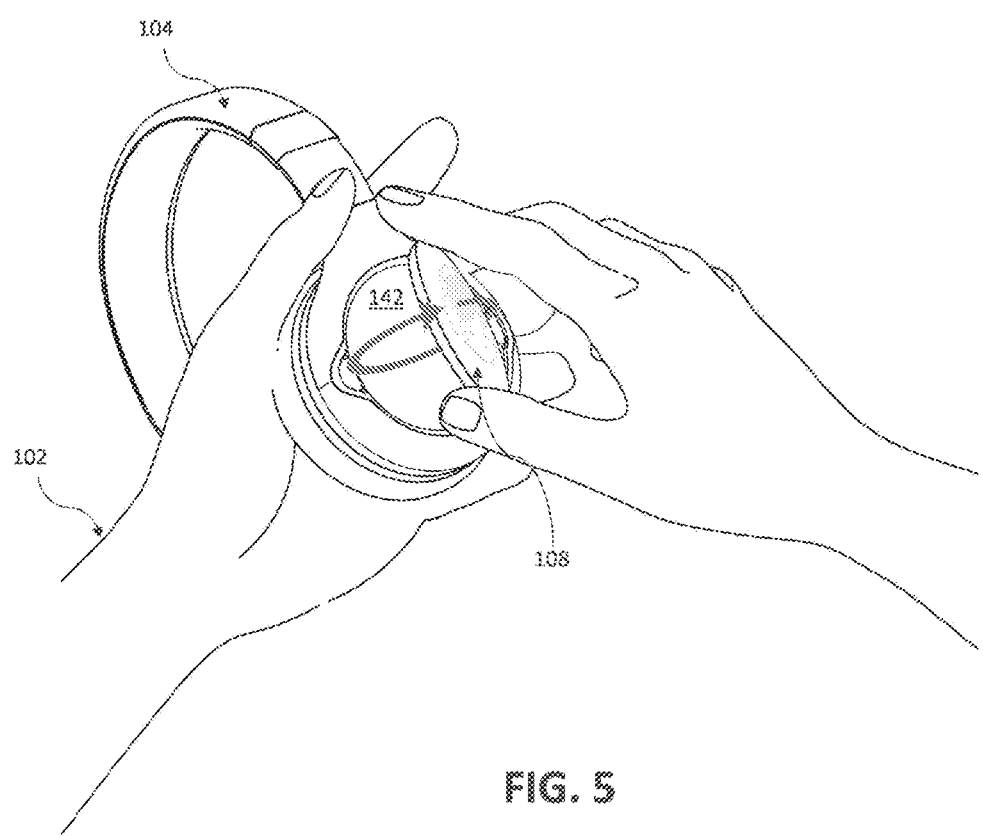
FIG. 5 depicts a perspective view of a schematic diagram depicting rotation of an object in a receiving portion of a wearable device, according to at least some embodiments disclosed herein.
Figure 6:
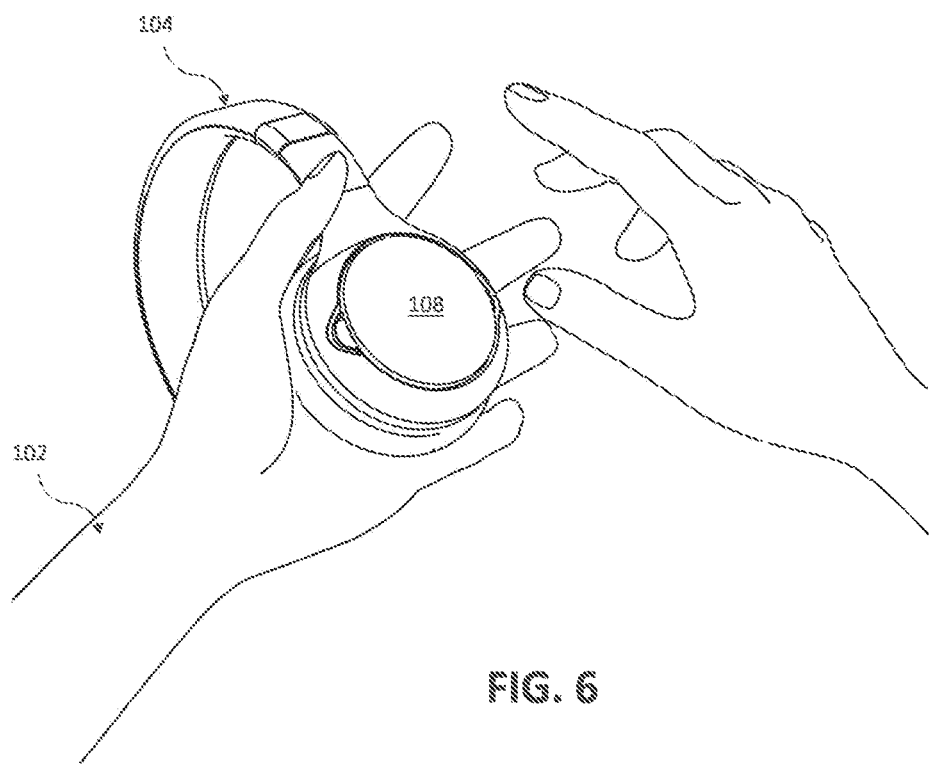
FIG. 6 depicts a perspective view of a schematic diagram of an object affixed to a receiving portion of a wearable device, according to at least some embodiments disclosed herein.

FIG. 1 and FIG. 3 depict block diagrams of cloud solution architecture of a system. As shown in FIG. 1, the system includes an object 108, a wearable device 104, Internet 106, a cloud backend 110, and a cloud web portal 112. The object 108 (of FIG. 1, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16) is an item or component that is designed in a manner to enhance the commercial or educational appeal of the wearable device 104 (of FIG. 1, FIG. 3, FIG. 4, FIG. 5, FIG. 6, FIG. 7, FIG. 8, FIG. 9, FIG. 10, FIG. 11, FIG. 12, FIG. 13, and FIG. 14). The object 108 can be whatever size or shape. In some examples, the object 108 may click or snap on top of the wearable device 104 (e.g., the headphones), and in other examples, the object 108 may not. The object 108 may include text and/or graphics (of cartoon characters, collegiate mascots, professional sports team mascots, etc.). Such text and/or graphics may demonstrate the nature of the digital content stored on the object 108. For example, the text "Goldilocks and the Three Bears" accompanied by a graphic of showing a child and three bears would demonstrate that the digital content stored on the object 108 may be the audiobook associated with the fairytale Goldilocks and the Three Bears. In another example, the graphic of a cartoon character on the object 108 may demonstrate that the digital content stored on the object 108 may be audio and/or visual content associated with a television show containing the cartoon character. In all exemplary embodiments of the object 108 provided herein, a mixture of mechanical, magnetic, optical, and/or or circuitry may be used to aid security, cost of production, or reliability of functionality.

Figure 2:
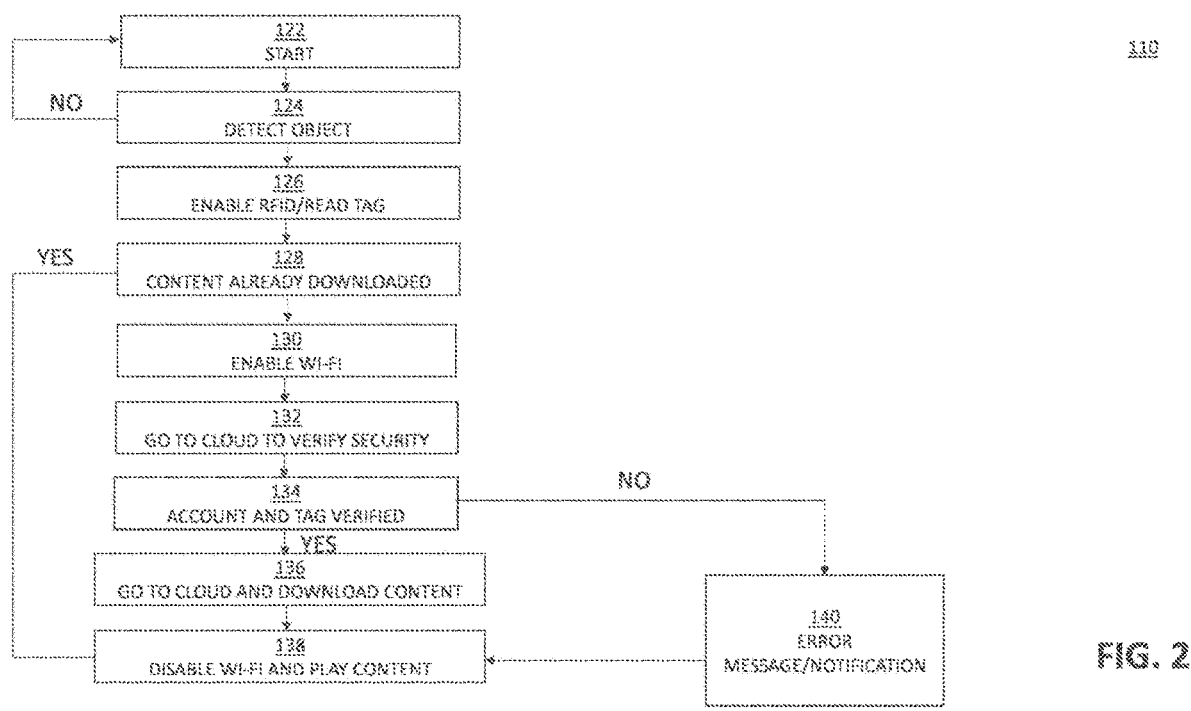
FIG. 2 depicts a block diagram of a method executed by a cloud backend of a system according to at least some embodiments disclosed herein.

A user 102 (of FIG. 4, FIG. 5, FIG. 6, FIG. 7, FIG. 8, FIG. 9, FIG. 10, FIG. 12, FIG. 13, and FIG. 14) may utilize an application executable on a computing device to engage a cloud web portal 112 (of FIG. 1 and FIG. 3) to create and sign into a user account in the cloud backend 110 (of FIG. 1, FIG. 2, and FIG. 3). In some examples, such interaction may occur via a wireless communication method through the Internet 106 (of FIG. 1 and FIG. 3). Creation of such user account occurs prior to purchase and use of the object 108. The user 102 may also interact with one or more components of the cloud web portal 112, such as an object management component 114, a content management component 116, a user account management component 118, and/or a security and validation component 120, as shown in FIG. 3.

The object 108 may then interface with a receiving portion 142 (of FIG. 4, FIG. 5, and FIG. 9) of the wearable device 104 using near field communication (NFC), which will be elaborated on herein. The object 108 is received by and affixed to the receiving portion 142 of the wearable device 104 via a mechanical means or a magnetic means, among other means not explicitly described herein. The receiving portion 142 of the wearable device 104 also includes one or more speakers. In embodiments, multiple objects can be received and affixed to the device, as will be described.

Tag data of the object 108 is read and used to interact with the cloud backend 110 to download digital content (e.g., audio and/or visual content) or directly stream the digital content. The audio and/or the visual content may be associated with podcasts, audiobooks, music, plays, television shows, movies, etc., and is not limited to any specific audio and/or visual content. In an illustrative example, the digital content may be audio content for a children's book (e.g., an audiobook), such as Goldilocks and the Three Bears. The digital content may be associated with a first identifier and a first security code.

A second digital content may be audio content for a scientific podcast. The second digital content may be associated with a second identifier and a second security code. The first security code and the second security code are used for the secure management of the first digital content and the second digital content, respectively. In some examples, the first digital content and the second digital content may additionally include other cryptology mechanisms, not explicitly listed herein, to assist in the secure management of the first digital content and the second digital content.

Moreover, it is determined if the wearable device 104 is associated with the user account and if the digital content was purchased in the cloud backend 110 by the user 102 prior to downloading or streaming the digital content.

FIG. 2 depicts a block diagram of a method executed by the cloud backend 110 of the system of FIG. 1 or FIG. 3. A process step 122 begins the method of FIG. 2. A process step 124 follows the process step 122 and includes the receiving portion 142 of the wearable device 104 detecting the object 108. A process step 126 follows the process step 124. In the process step 126, the receiving portion 142 of the wearable device 104 comprises an active radio frequency identification (RFID) reader and the object 108 comprises an RFID passive tag. In the process step 126, the RFID reader reads the RFID passive tag of the object 108.

A process step 128 follows the process step 126 and includes determining if content was already downloaded to the object 108. If the response to the process step 128 is "YES," the method moves onto a process step 138 that includes disabling a wireless communication method of the system and playing the digital content to the user 102 via one or more speakers of the wearable device 104. If the response to the process step 128 is "NO," the method moves on to a process step 130 to enable the wireless communication method of the system.

A process step 132 follows the process step 130 and includes verifying security of the digital content via the cloud. A process step 134 follows the process step 132 and includes determining if the user account and the RFID passive tag of the object 108 are verified. If the response to the process step 134 is "YES," the method moves onto a process step 136 that includes downloading content from the cloud. If the response to the process step 134 is "NO,"the method moves to a process step 140, which includes producing an error message or notification for the user 102.

Figure 9:
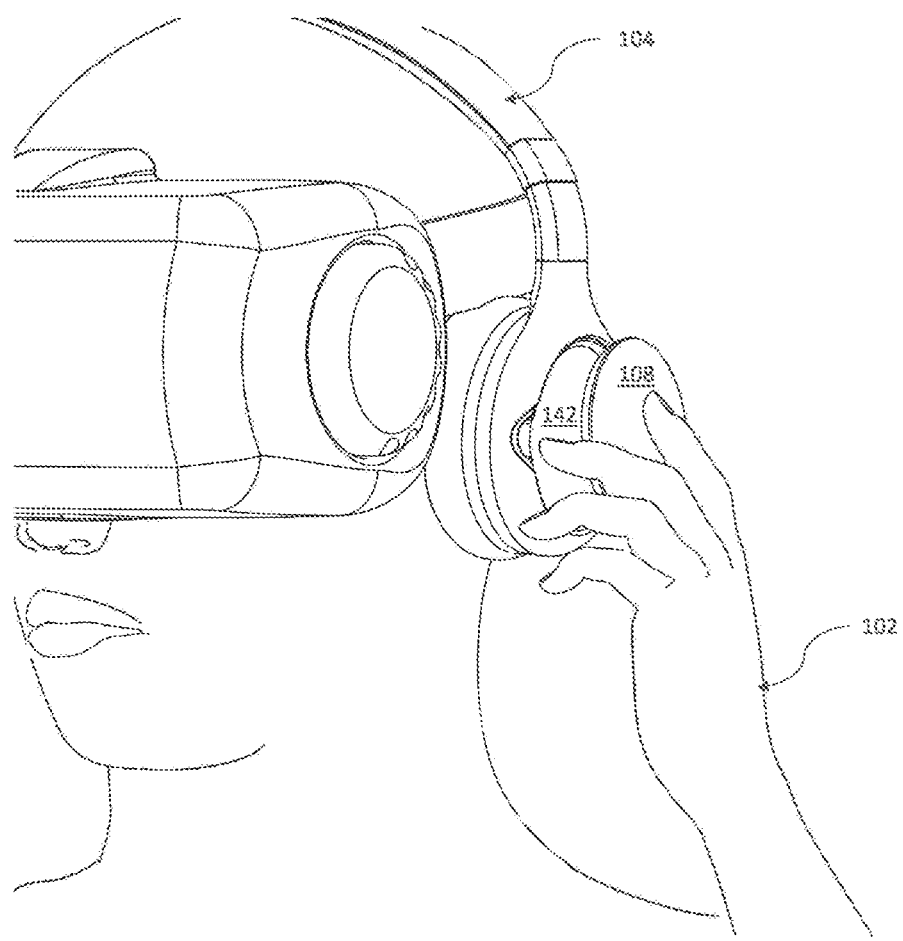
FIG. 9 depicts a perspective view of a schematic diagram depicting an object being affixed to a receiving portion of a wearable device, according to at least some embodiments disclosed herein.
Figure 10:
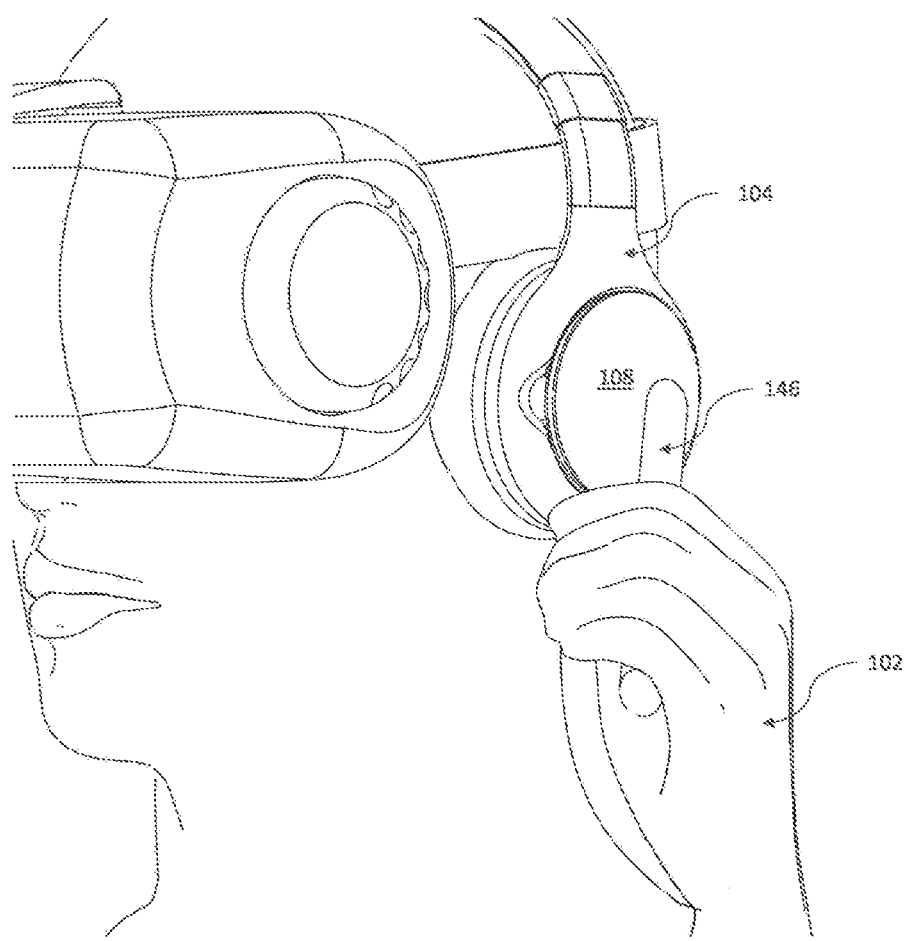
FIG. 10 depicts a perspective view of a schematic diagram depicting a wand object interacting with a disk object affixed to a receiving portion of a wearable device, according to at least some embodiments disclosed herein.

The wearable device 104 described herein is configured to be worn by the user 102. In a first illustrative example, and as depicted in FIG. 4, FIG. 5, FIG. 6, FIG. 7, FIG. 8, FIG. 13, and FIG. 14, the wearable device 104 comprises headphones 104. In this first example, the digital content comprises the audio content. In a second illustrative example, and as depicted in FIG. 9 and FIG. 10, the wearable device 104 comprises a virtual reality (VR) headset. In this second illustrative example, the digital content comprises the audio content and the visual content such that the visual content may be displayed in two-dimensions or three-dimensions to the user 102 via a display of the VR headset and the user 102 may listen to the audio content via the headphones associated with the VR headset. It should be appreciated that the wearable device 104 is not limited to such examples, as such examples are provided for illustrative purposes only. In some examples, the wearable device may comprise an augmented reality headset, or a mixed reality headset, among other wearable devices not explicitly described herein. In some examples, tactile effects are used while or subsequent to playing the audio and/or the visual content on the wearable device 104.

It should be appreciated that the object 108 may be affixed to the receiving portion 142 of the wearable device 104 via a mechanical means or a magnetic means, among other means not explicitly described herein. In a first example, the object 108 comprises a first set of magnets and the RFID passive tag. The RFID passive tag may include a smart chip 162, a printed antenna 160, and an optical mark 164 of FIG. 16. The printed antenna 160 may be used for WLAN, a mobile data radio technology (such as Long-Term Evolution (LTE) standard, Universal Mobile Telecommunications System (UMTS), or its predecessor or successor), or a connection socket for connecting a cable of a local network that also has Internet access (e.g., a connection socket for an Ethernet cable).

In this first embodiment, the receiving portion 142 of the wearable device 104 comprises: a second set of magnets, the active RFID reader, and a Hall sensor 154. A quantity of the magnets in the first set of magnets and the second set of magnets is not limited to any particular quantity. Further, in some examples, the first set of magnets and the second set of magnets may be a magnetic portion or component.

As described herein, a "Hall sensor" or a "Hall effect sensor" is a device that is used to measure the magnitude of a magnetic field. The output voltage of the Hall sensor 154 is directly proportional to the magnetic field strength through it. Hall Effect sensors are used for proximity sensing, positioning, speed detection, and sensing applications.

When the object 108 is received by the receiving portion 142 of the wearable device 104, the first set of magnets of the object 108 is in a magnetic connection with the second set of magnets of the receiving portion 142 of the wearable device 104 to affix the object 108 to the receiving portion 142 of the wearable device 104. Moreover, when the object 108 is received by the receiving portion 142 of the wearable device 104, the first set of magnets of the object 108 activates the Hall sensor 154 of the wearable device 104. In turn, the Hall sensor 154 activates a read cycle of the active RFID reader in the receiving portion 142 of the wearable device 104. The activation of the read cycle of the active RFID reader of the receiving portion 142 of the wearable device 104 comprises detection of the identifier associated with the digital content and the security code associated with the digital content from the RFID passive tag of the object 108.

Figure 17:
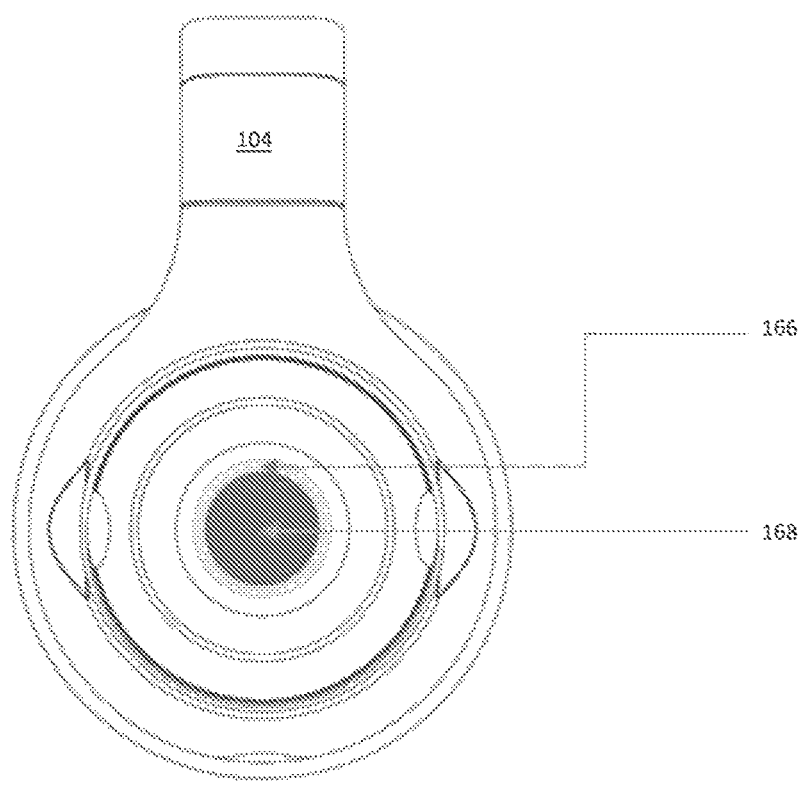
FIG. 17 depicts a perspective view of a schematic diagram of a wearable device, a ferrous magnetic cup, and a permanent magnet, according to at least some embodiments disclosed herein.
Figure 18:
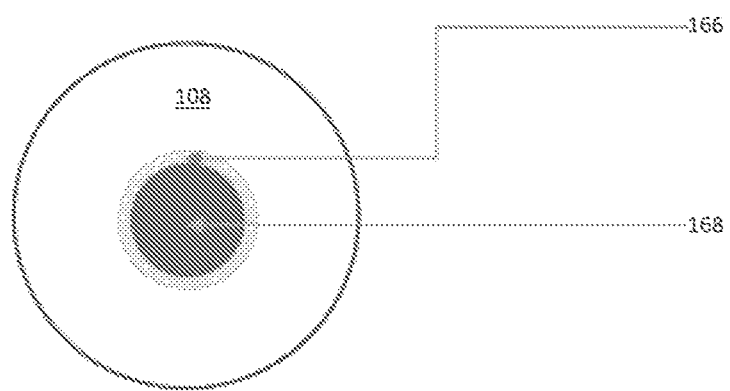
FIG. 18 depicts a perspective view of a schematic diagram of an object, a ferrous magnetic cup, and a permanent magnet, according to at least some embodiments disclosed herein.
Figure 19:
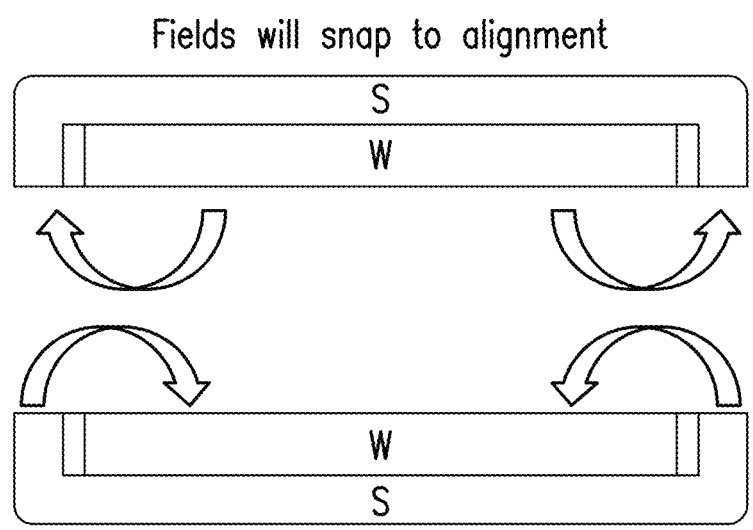
FIG. 19 depicts a perspective view of a schematic diagram of a magnetic force-based method for attaching and positioning an object to a wearable device, according to at least some embodiments disclosed herein.
Figure 20:
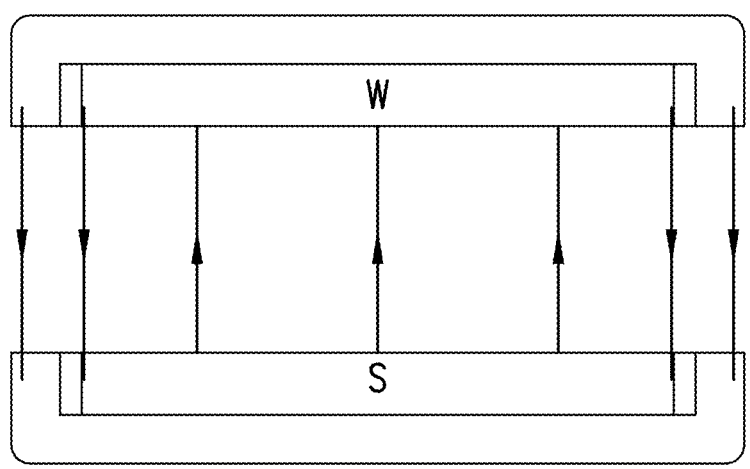
FIG. 20 depicts a perspective view of a schematic diagram of a magnetic force-based method for attaching and positioning an object to a wearable device, according to at least some embodiments disclosed herein.
Figure 21:
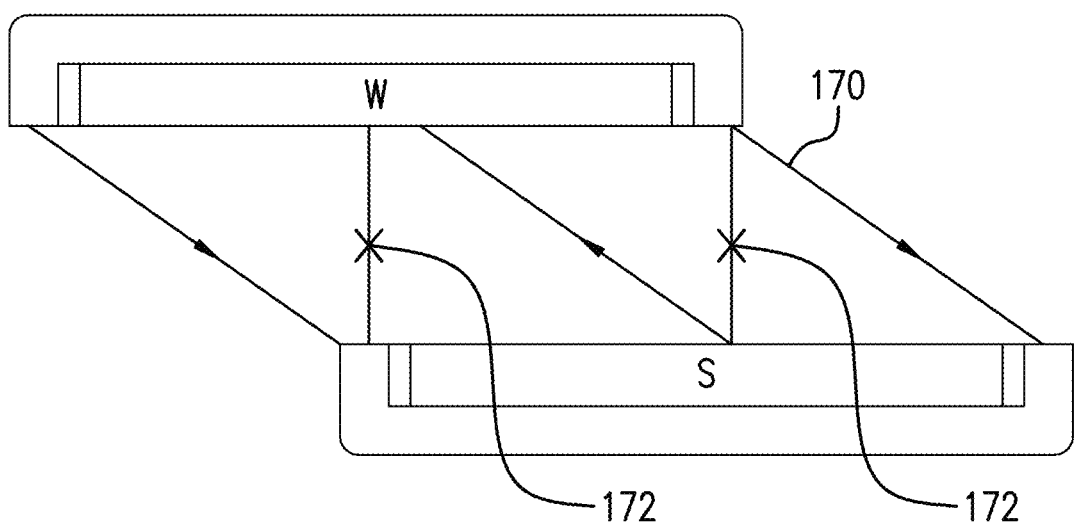
FIG. 21 depicts a perspective view of a schematic diagram of a magnetic force-based method for attaching and positioning an object to a wearable device, according to at least some embodiments disclosed herein.
Figure 22:
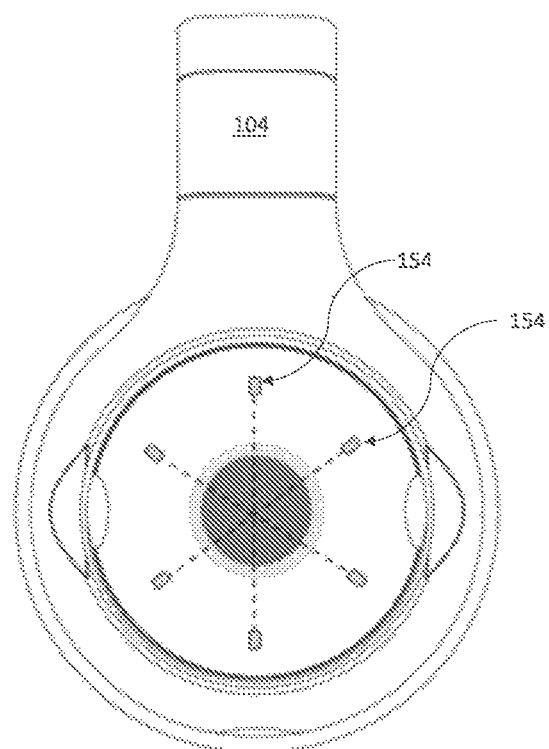
FIG. 22 depicts a perspective view of a schematic diagram of a position detection method used for affixing an object to a wearable device, according to at least some embodiments disclosed herein.
Figure 23:
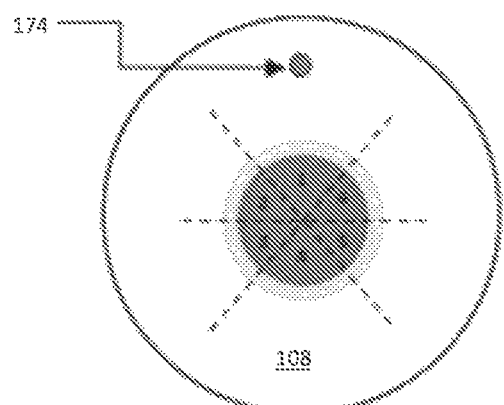
FIG. 23 depicts a perspective view of a schematic diagram of a position detection method used for affixing an object to a wearable device, according to at least some embodiments disclosed herein.

In a further example, and as depicted in FIG. 17, FIG. 18, FIG. 19, FIG. 20, and FIG. 21, a magnetic force-based method may be used for attaching and positioning the object 108 within the receiving portion 142 of the wearable device 104. A ferrous metal cup 166 and a permanent magnet 168 are depicted in FIG. 17 and FIG. 18. In order to achieve robust and accurate locating of the object 108, an aligning magnetic field structure is used. As shown in FIG. 19, FIG. 20, and FIG. 21, field alignment forces the object 108 to a location in an axial position such that misalignment is not possible, as repulsive forces are generated when the fields are misaligned, thereby laterally pushing the object 108 into a central position. Such misalignment is further depicted in FIG. 21, where the misaligned fields 172 pull closer 170, with a net force pushing towards repulsion. Moreover, the magnetic field described herein is concentrated by use of the ferrous metal cup 166 that shapes the magnetic field lines. The ferrous metal cup 166 provides a degree of shielding against stray magnet fields.

Furthermore, in referencing FIG. 22, FIG. 23, FIG. 24, FIG. 25, and FIG. 26, the object 108 contains an RFID tag that uniquely identifies the object 108 and is mapped to specific content. The use of a unique RFID tag abstracts the content from the object 108, thereby allowing any object 108 to be associated with any content or content collection. In order for the RFID tag to be read, it must be in close proximity to the RFID reader located in the wearable device 104 (e.g., the headphones). In addition, a trigger event is required to indicate to the system to attempt to read the RFID tag. In examples described herein, the trigger event is generated by one or more Hall sensors 154 (of FIG. 22, FIG. 24, FIG. 25, and FIG. 26), which produces a digital output when subject to the magnetic field.

Figure 24:
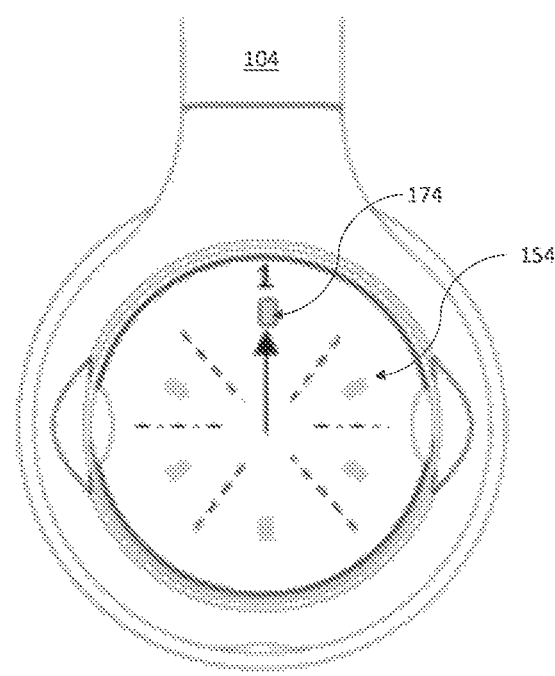
FIG. 24 depicts a perspective view of a schematic diagram of a position detection method used for affixing an object to a wearable device, according to at least some embodiments disclosed herein.
Figure 25:
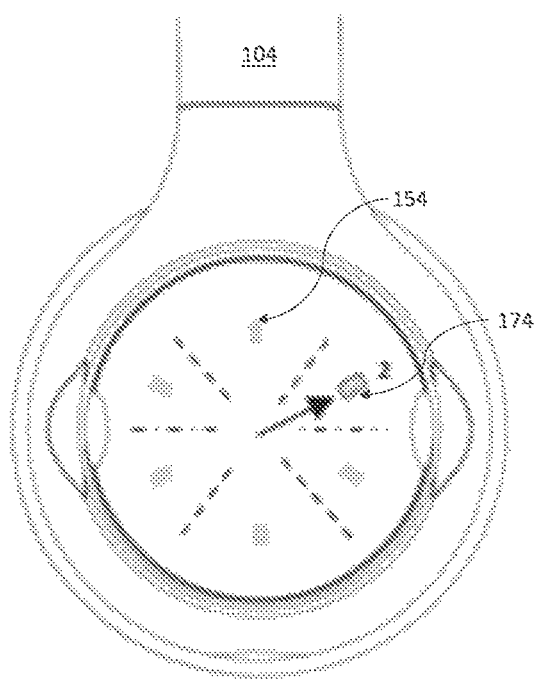
FIG. 25 depicts a perspective view of a schematic diagram of a position detection method used for affixing an object to a wearable device, according to at least some embodiments disclosed herein.
Figure 26:
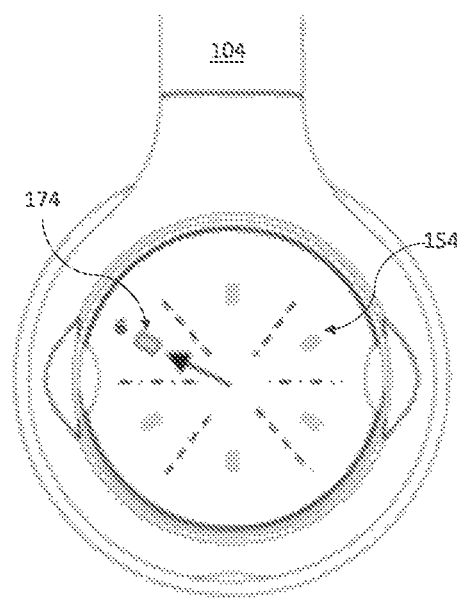
FIG. 26 depicts a perspective view of a schematic diagram of a position detection method used for affixing an object to a wearable device, according to at least some embodiments disclosed herein.

The magnetic field comes from a permanent magnet 174 (of FIG. 23, FIG. 24, FIG. 25, and FIG. 26) located inside of the object 108. Moreover, in examples, the object 108 comprises the multiple Hall sensors 154 in a circular pattern to allow the rotational position of the object 108 to be detected in an absolute fashion. The circular-shaped pattern is provided for illustrative purposes only and other shaped patterns are contemplated herein. Further, as shown in FIG. 24, FIG. 25, and FIG. 26, the object 108 can index or trigger multiple sets of content based on the rotational position of the object 108 in relation to the wearable device 104 (e.g., a first position of FIG. 24, a second position of FIG. 25, and a sixth position of FIG. 26, among others not explicitly listed herein).

In another embodiment, a printed barcode may be present on the object 108. The receiving portion 142 of the wearable device 104 comprises a light sensor comprising a photodiode. The receiving portion 142 of the wearable device 104 also includes an optical sensory array 150 (of FIG. 13). The optical sensor array 150 comprises one or more photoelements, such as photodiodes or transistors arranged in an N×N matrix configuration. In response to the object 108 being received by the receiving portion 142 of the wearable device 104, the light sensor of the receiving portion 142 of the wearable device 104 is covered by the object 108 to trigger a handshake to detect the identifier associated with the digital content and the security code associated with the digital content of the object 108.

Figure 13:
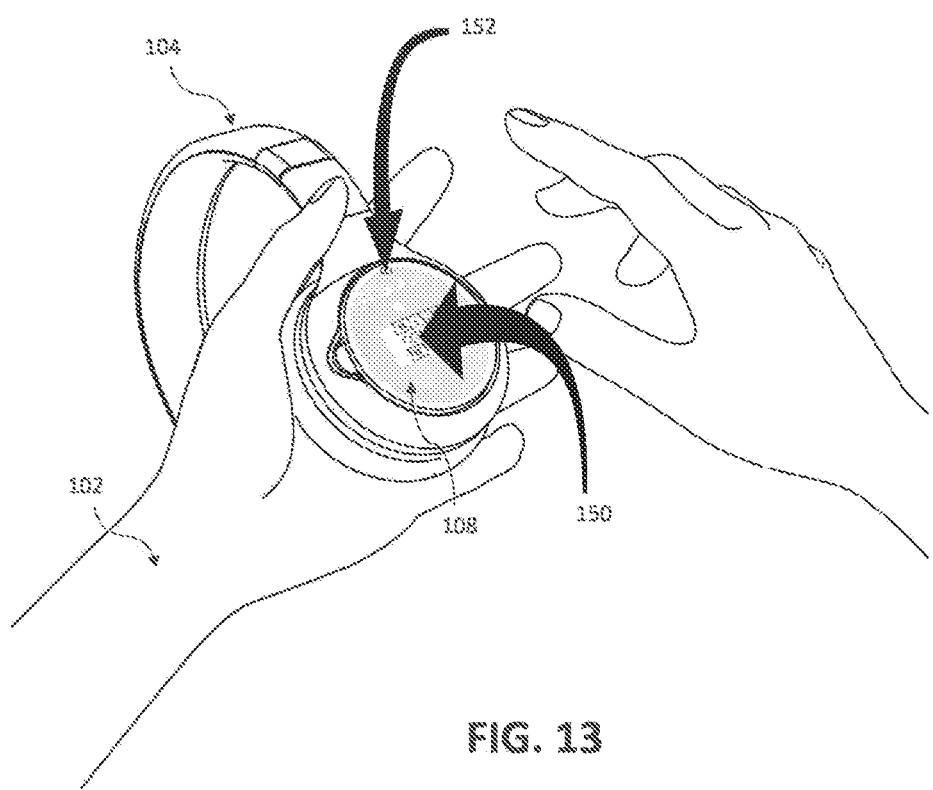
FIG. 13 depicts a perspective view of a schematic diagram depicting an optical sensor array and a light sensor of an object affixed to a receiving portion of a wearable device, according to at least some embodiments disclosed herein.
Figure 14:
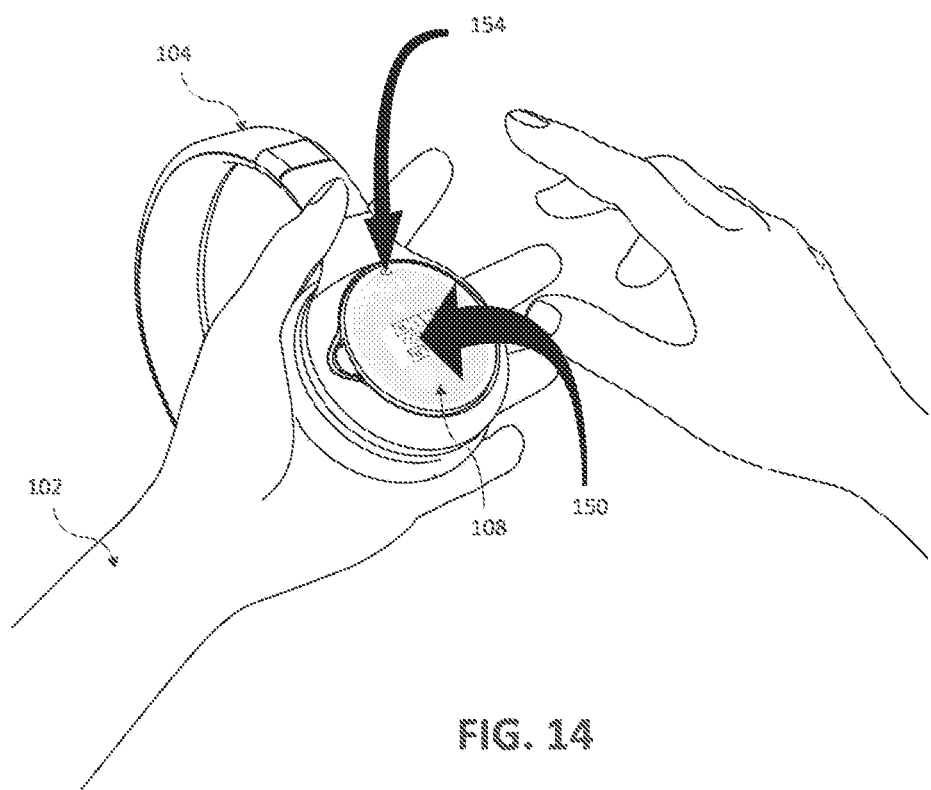
FIG. 14 depicts a perspective view of a schematic diagram depicting a Hall sensor and an optical sensor array of an object affixed to a receiving portion of a wearable device, according to at least some embodiments disclosed herein.

In a further embodiment, and as depicted in FIG. 13, the object 108 comprises electronic circuitry 152 and a means to store the identifier and the security code. Such storage may include the memory or the storage component. In this embodiment, the receiving portion 142 also includes the electronic circuitry 152. In response to the object 108 being received by the receiving portion 142 of the wearable device 104, a circuit in the wearable device 104 is closed, allowing the identifier associated with the digital content and the security code to be transferred to the wearable device 104.

In some examples of this embodiment, the wearable device 104 may comprise a microphone or a plurality of microphones. The microphone or the plurality of microphones may comprise voice recognition software. The voice recognition software may be configured to receive and analyze voice commands from the user 102 to manage the digital content. In other examples, the microphone or plurality of microphones may be used for noise cancelation, echo cancellation, voice intelligibility and other acoustic functions.

Moreover, in examples, the microphone or plurality of microphones may be used to assist in a detection of an angle of arrival of an acoustic wave. The wearable device 104 may contain an antenna, or a plurality of antennae, to be used for a beamforming function as used in detection of the angle of arrival of a radio wave.

Figure 15:
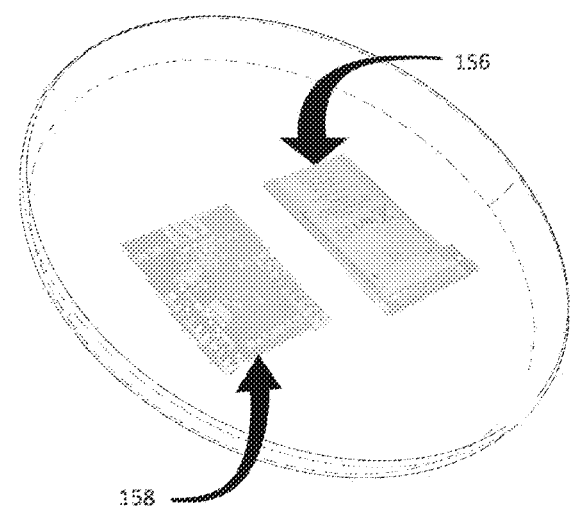
FIG. 15 depicts a perspective view of a schematic diagram depicting a transmitter and a battery of an object, according to at least some embodiments disclosed herein.
Figure 16:
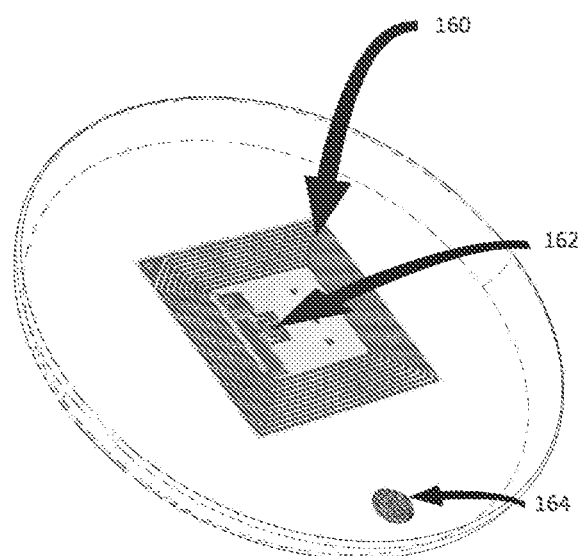
FIG. 16 depicts a perspective view of a schematic diagram depicting an antenna, a smart chip, and an optical mark of an object, according to at least some embodiments disclosed herein.

In another embodiment, and as depicted in FIG. 15, the receiving portion 142 of the wearable device 104 comprises an electronic receiver 158. Further, the object 108 comprises an electronic transmitter and a battery 156. In this embodiment, when the object 108 is received by the receiving portion 142 of the wearable device 104, the identifier associated with the digital content and the security code are transferred to the wearable device 104.

In these previous examples and embodiments, once the identifier and the security code are transferred to the wearable device 104, the user 102 may activate audio play and/or visual display of digital content in numerous ways. In a first embodiment, and as depicted in FIG. 10, such activation occurs when the user 102 touches the object 108 with another object, such as a wand object 146. It should be appreciated that the wand object 146 is provided for illustrative purposes only and other objects are contemplated. In this first embodiment, the wand object 146 comprises an RFID tag and optionally a magnet, which, when brought into close enough proximity with the wearable device 104, the wand object 146 triggers the read cycle of the active RFID reader in the wearable device 104.

Figure 11:
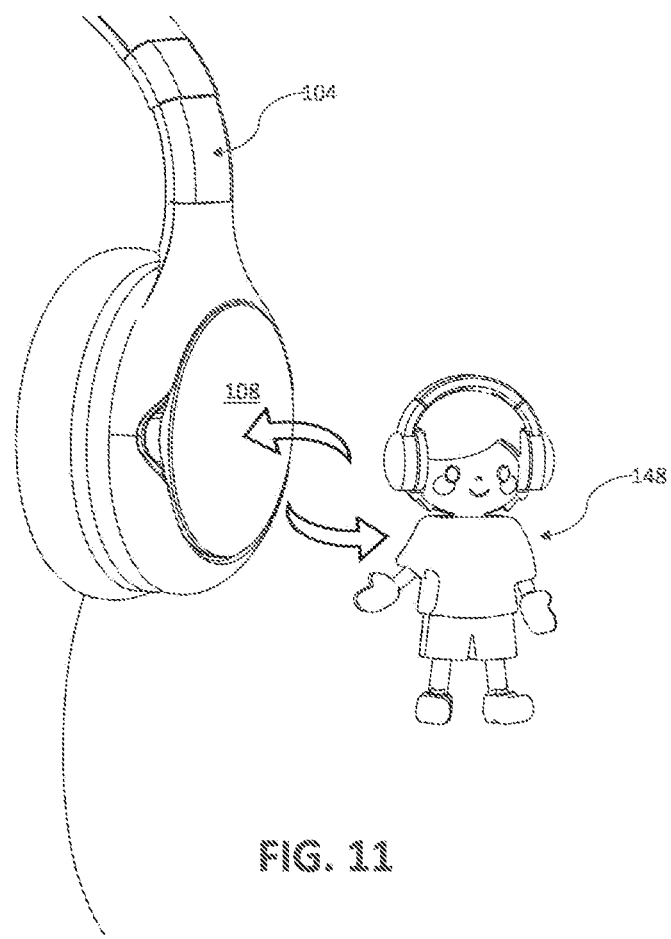
FIG. 11 depicts a perspective view of a schematic diagram depicting a figurine object interacting with a disk object affixed to a receiving portion of a wearable device, according to at least some embodiments disclosed herein.
Figure 12:
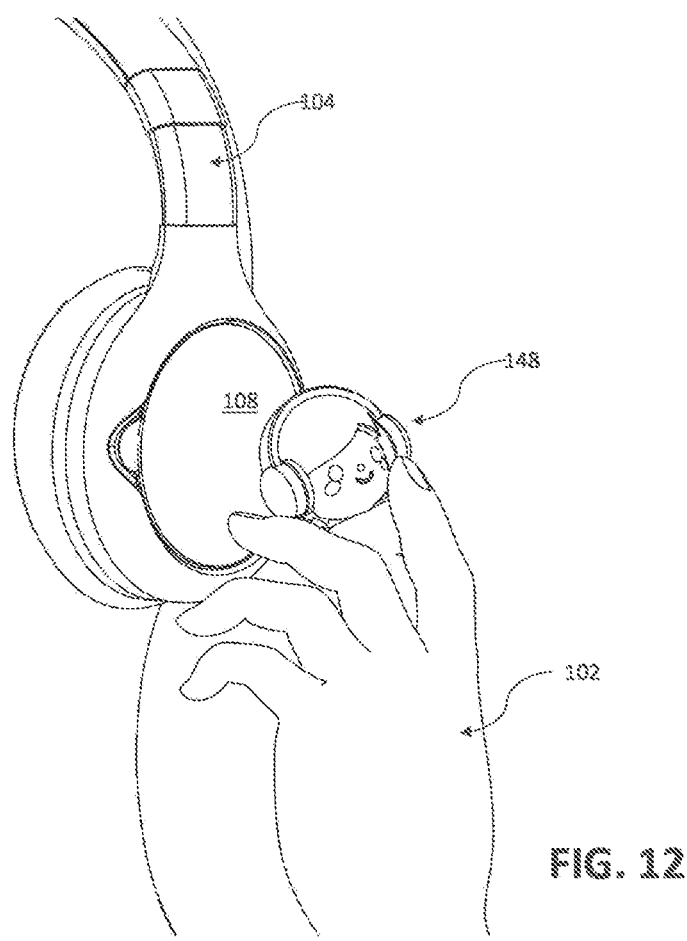
FIG. 12 depicts a perspective view of a schematic diagram depicting a figurine object interacting with a disk object affixed to a receiving portion of a wearable device, according to at least some embodiments disclosed herein.

In a second embodiment, and as depicted in FIG. 11 and FIG. 12, such activation occurs when the user 102 touches the object 108 with another object, such as a figurine object 148. It should be appreciated that the figurine object 148 is provided for illustrative purposes only and other objects are contemplated. The figurine object 148 may be a toy, an animal figurine, or a mascot figurine, among other examples. In this second embodiment, the figurine object 148 comprises a magnet and an RFID tag, which, when brought into close enough proximity with the wearable device 104, the magnet of the figurine object 148 triggers the read cycle of the active RFID reader in the wearable device 104. It should be appreciated that these examples are provided for illustrative purposes only, and other examples are contemplated herein.

In additional examples, the wearable device 104 may be configured to transmit the digital content to another device via a wired means or a wireless means. In examples where the transfer occurs via the wired means, the wearable device 104 (e.g., the headphones) comprises a stereo jack connector (which may be approximately 3.5 mm) for the wired transmission of the digital content. In some examples, the audio content may include radio broadcast content. The means to transmit the digital content may occur by any wireless communication method. In some examples, near field communication (NFC) protocols may be used for the communication between the wearable device 104 and the other device over a distance of 4 cm or less.

Examples of the wireless connection means may include a Bluetooth connection, a radio broadcast technology, a mesh system, an Ultra-wideband (UWB) connection, or a Wi-Fi connection, among others not explicitly listed herein. As described herein, UWB is a radio-based communication technology for short-range use and fast and stable transmission of data. Further, as described herein, FCC uses 3.1 to 10.6 GHz in the USA for UWB, where the FCC and the International Telecommunication Union Radiocommunication Sector (ITU-R) currently define UWB as an antenna transmission for which emitted signal bandwidth exceeds the lesser of 500 MHz or 20% of the arithmetic center frequency. Other connection means are contemplated herein, such as a touch connection means or technology that occurs via galvanic or capacitive coupling by skin contact or another mechanism. Additionally, the one or more connection methods or means described herein may operate simultaneously in examples.

Figure 7:
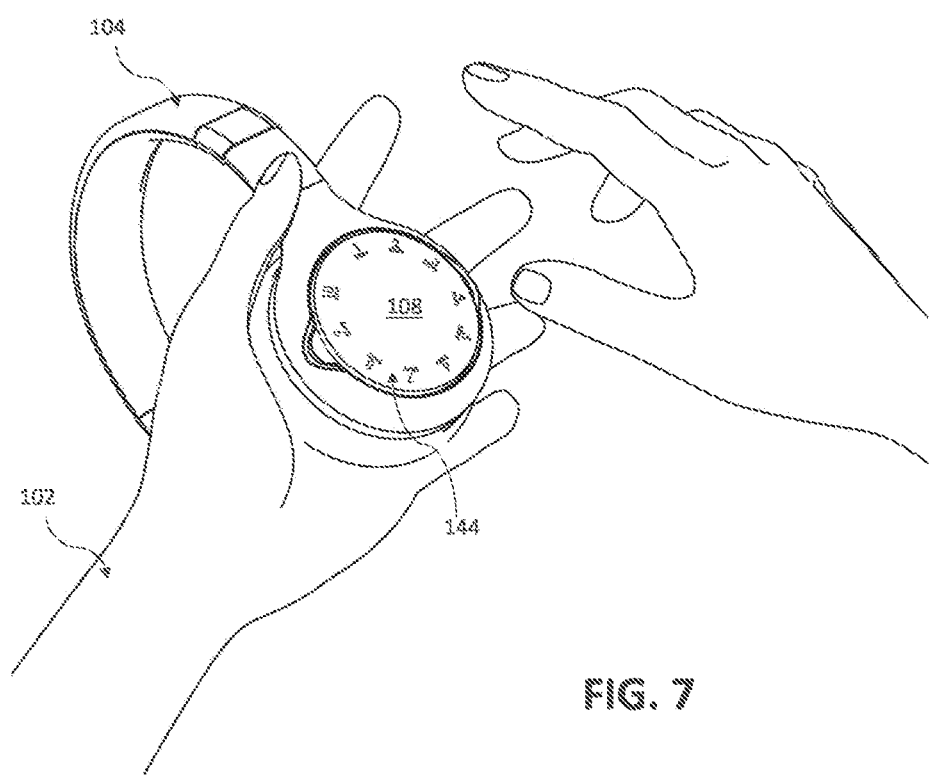
FIG. 7 depicts a perspective view of a schematic diagram of an object affixed to a receiving portion of a wearable device, the object having a timer mechanism, according to at least some embodiments disclosed herein.
Figure 8:
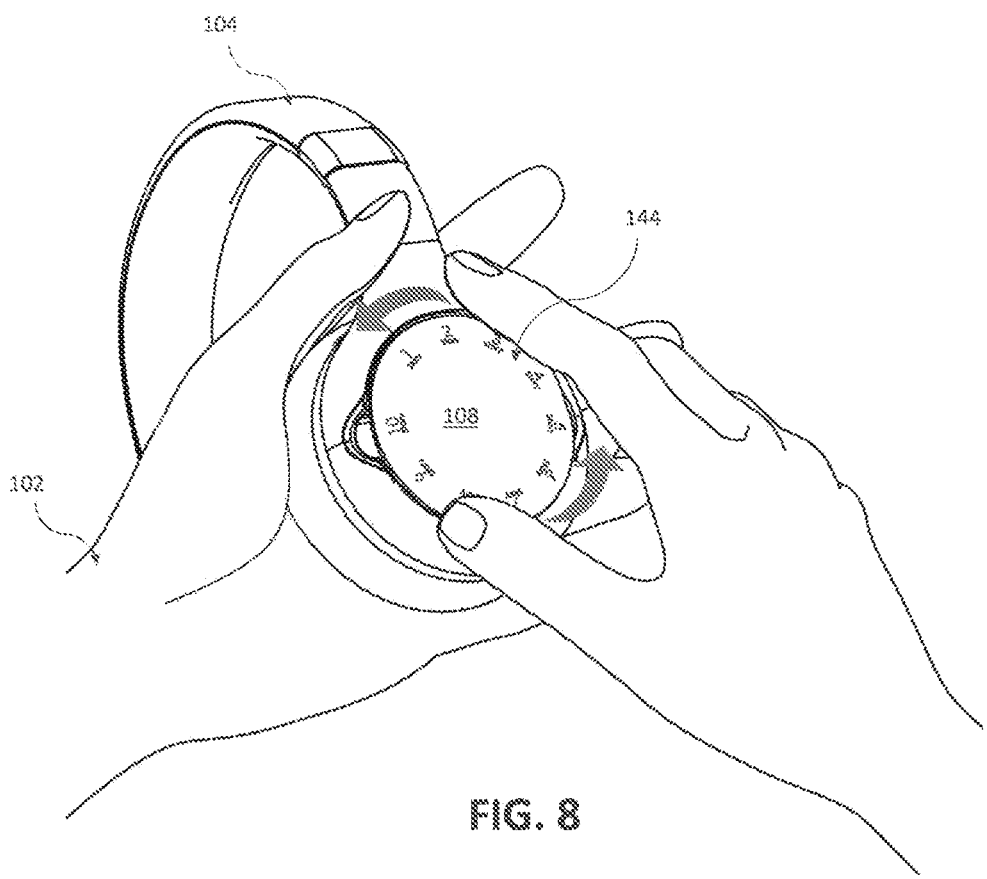
FIG. 8 depicts a perspective view of a schematic diagram of an object affixed to a receiving portion of a wearable device, the object having a timer mechanism, according to at least some embodiments disclosed herein.

As shown in FIG. 7 and FIG. 8, the object 108 may also include a timer mechanism 144 to control a duration of the digital content playback, which may be set by the user 102 or another user (not shown). In an example, the other user may be a parent and the user 102 may be a child, such that the parent controls the duration of the digital content played back on the wearable device 104 being worn by the user 102.

In another example, the timer mechanism 144 may be a rotary encoder with an optical code or mark 164 (of FIG. 16) using a grey scale printed on the inside of the object 108. It should be appreciated that UWB technology may be used herein in some examples. As the object 108 is rotated within the receiving portion 142 of the wearable device 104, the optical sensor array 150 (comprising one or more photoelements, such as photodiodes or transistors arranged in an N×N matrix configuration) of the receiving portion 142 of the wearable device 104, with a light source shining on the scale, is used to detect the change in the grey scale pattern as it is rotated. The resulting serial data pattern is processed by the host microcontroller ("MCU"), and applying appropriate algorithms, the absolute or relative position of the rotary movement of the object 108 is determined. Depending on the particular implementation, features of the present invention may be achieved by implementing the MCU, such as CAST'S R8051XC2 microcontroller; Intel's MCS 51 (i.e., 8051 microcontroller); and/or the like. Alternately, some implementations of the present invention may be implemented with embedded components that are configured and used to achieve a variety of features or signal processing.

An alternative mechanism includes using absolute discrete position sensing using an optical or electrical method. In this method, a plurality of optical sensors 152 or electrical contacts are arranged at N points around the circumference of the object 108. As the object 108 is rotated, the object 108 is arranged mechanically such that one or more of the sensors or contacts becomes engaged. In either method, the information obtained can be then used to set and control timing events.

Figure 48:
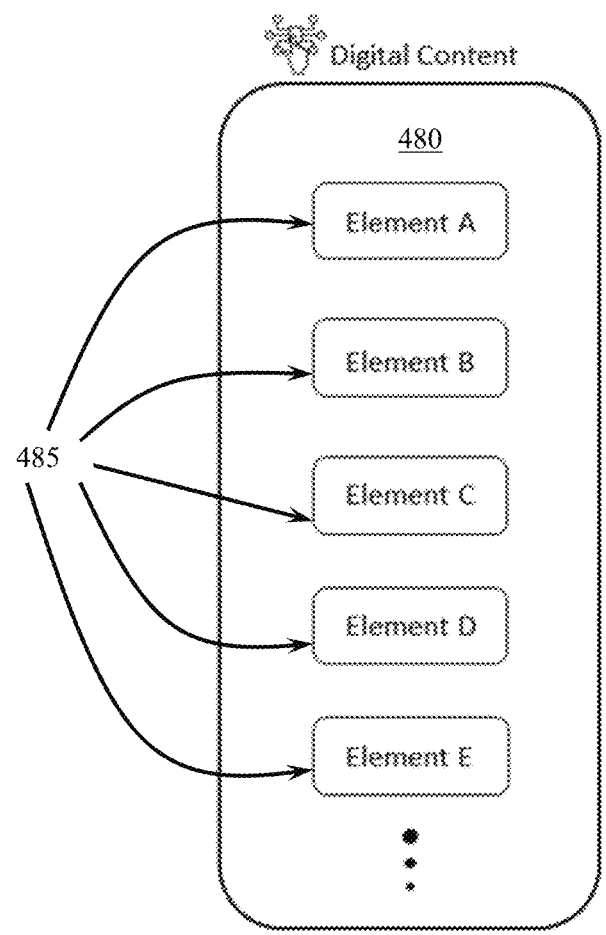
FIG. 48 illustrates an example embodiment of an index system.
Figure 50:
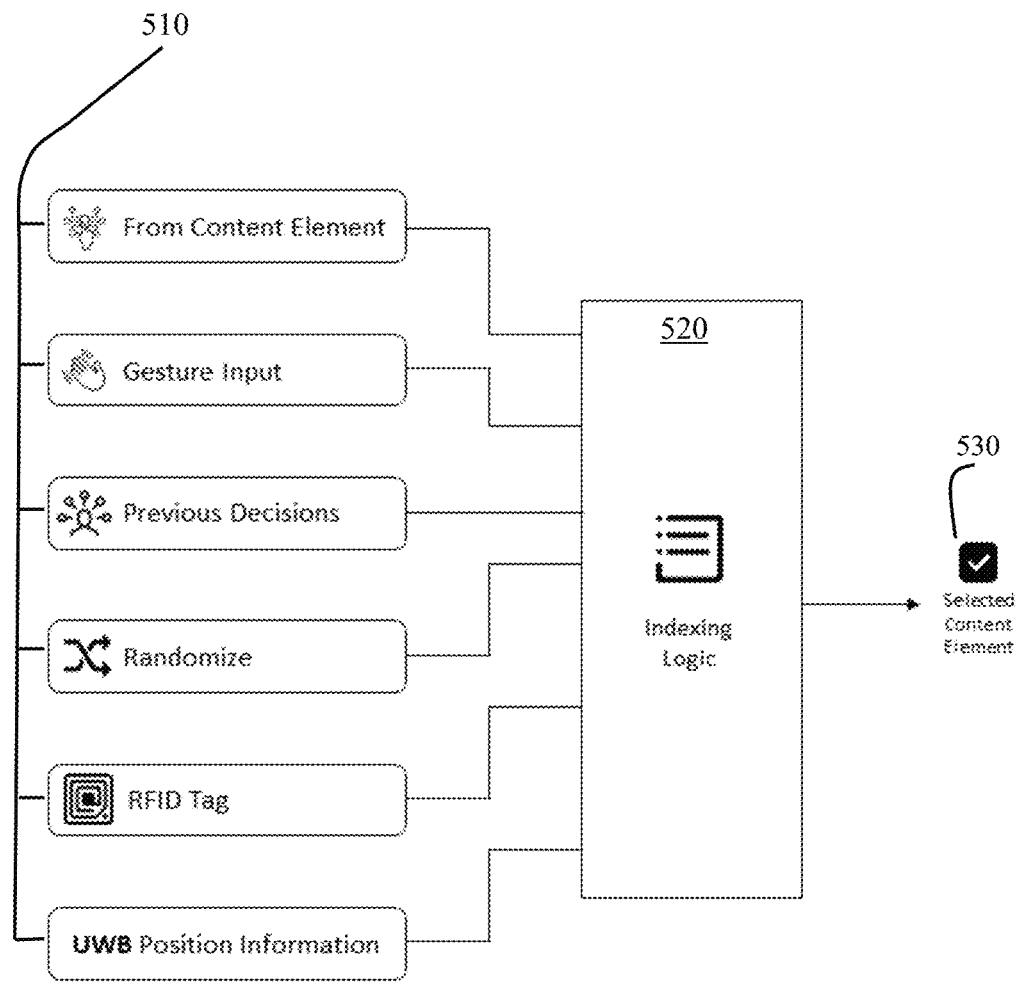
FIG. 50 shows various inputs including a content element just completed, or gesture inputs, or other inputs from the user.

An indexing system as depicted at least in FIG. 48, FIG. 28, FIG. 29, FIG. 30, and FIG. 31, determines the flow of digital content elements. As shown in FIG. 48, in some embodiments elements of digital content 485 may be arranged as a set 480. The playback of the content elements 485 is managed by the indexing system, an overview of which is shown in FIG. 50. The indexing system may comprise a set of inputs 510, a logic system 520, and an output 530. As shown in FIG. 50, the indexing system accepts any of multiple possible inputs 510, which may be of different types. The inputs may also include inputs from other users in a multi user environment. Further, the inputs may be accepted either individually or in combination as a set 480 of inputs. The system then applies to these inputs logical processing as determined by indexing logic 520, and generates as an output a selected digital content element 530 to be played next.

Figure 49:
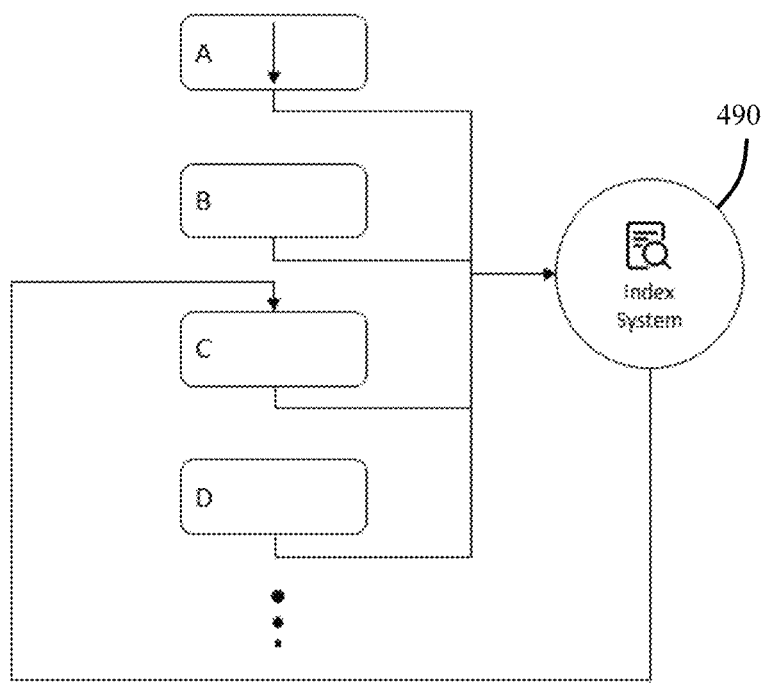
FIG. 49 shows a simple implementation of an indexing system.

FIG. 49 shows the basic operation of such an indexing system. Each block A, B, C, D . . . represents a digital content element. At the end of each block, i.e., after the block's digital content element "plays", the indexing system 490 is invoked and determines which block is to be played next. The logical flow from the end of a content element and through the indexing system identifies the next content element to be played. In embodiments, the next element to be played may simply be the next element in a predetermined sequence. Alternatively, the next element to be played may be determined by more involved logic set forth in the indexing system 490.

The user inputs may be classified based on any of a variety of characteristics of one or more users, one or more aspects of the system resources and/or the downloaded content they interact with, or other data not explicitly listed herein. The indexing system constitutes a relationship between the classification of one or more inputs and a discrete content element. By this means the indexing system when invoked can determine the content element that should be played by evaluating various data presented to it, including the classification of user inputs, historical activity, and the current system state.

Figure 52:
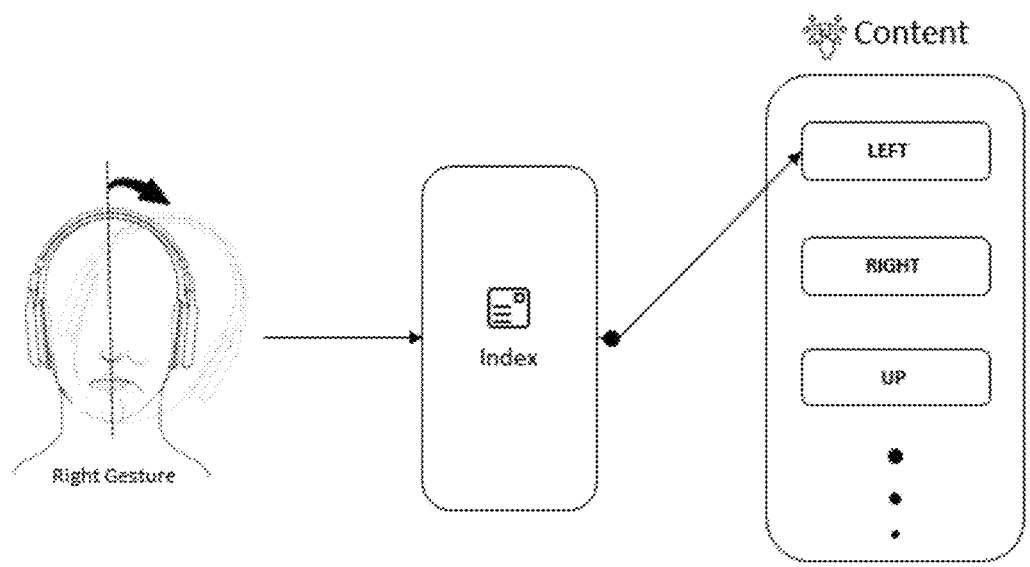
FIG. 52 illustrates an example in which a particular content element ends by giving the user a choice of options.

In embodiments, a decision node 176 may require the user to choose one of two options such as an Option A or an Option B of FIG. 49, or an Option Left or an Option Right of FIG. 52. Once the decision is made, the index system defines the logic flow that determines the next selected option to be played. An example of this concept is a storyline in which the character reaches a fork in the road and the user must choose whether to 'go left' or 'go right'. FIG. 52 shows the user creating a gesture input to the indexing system which then selects the content element to be played.

Further, there are multiple methods by which a decision node 176 selection can be confirmed. Such methods include tactile methods, motion methods, and/or audio methods, among others not explicitly listed herein. In one example, tactile input methods include capacitive touch sensor elements and tactile switches. In another example, motion input methods can be derived from one or more accelerometers built into the wearable device 104. In other examples, audio inputs may be obtained with a combination of microphone elements and voice detection electronics and software, with the voice detection electronics residing either locally or as part of a cloud service.

In other examples, spatial position information may be used as inputs to the index system at a decision node 176. The spatial position information can be obtained in an absolute fashion from a fixed reference station within the space, or in a relative sense from the relative position between a plurality of devices. In some examples, the spatial position information can be obtained in high precision by use of UWB RF technology.

Figure 42:
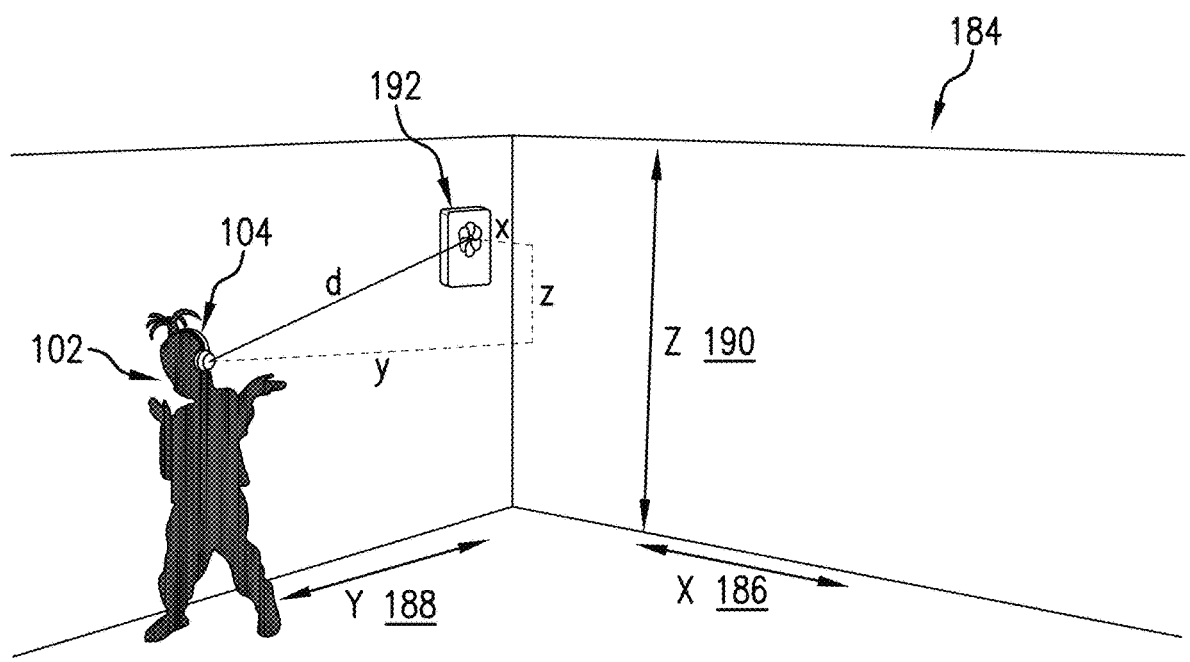
FIG. 42 depicts a perspective view of a schematic diagram of a user utilizing spatial positioning technology, according to at least some embodiments disclosed herein.
Figure 43:
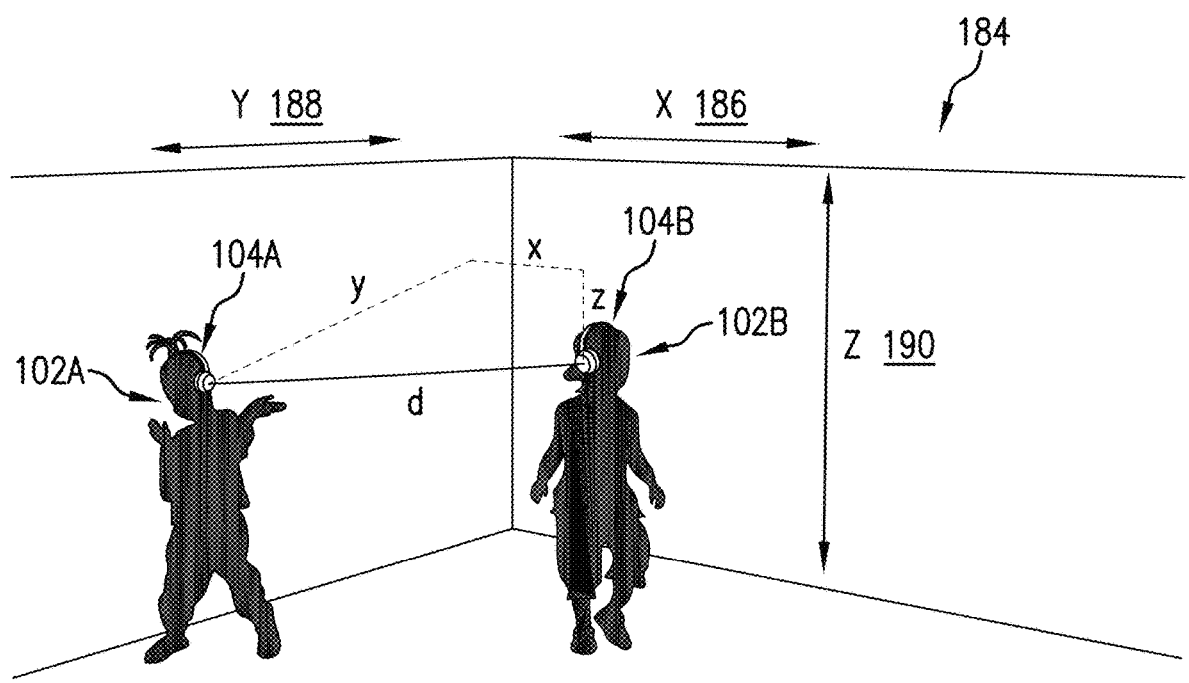
FIG. 43 depicts a perspective view of a schematic diagram of two users utilizing spatial positioning technology, according to at least some embodiments disclosed herein.

As an illustrative example, and as shown in FIG. 42 and FIG. 43, the wearable device 104 worn by the user 102 may be configured to locate its position in a defined space (such as a room 184 having an x-dimension 186, a y-dimension 188, and a z-dimension 190) and a respective position of one or more other devices or equipment (e.g., another device 192 of FIG. 42) in the defined space (e.g., the room 184) dynamically via one or more radio positioning technologies. Each of the one or more radio positioning technologies includes a Bluetooth technology, a BLE technology, an Ultra-wideband (UWB) technology, or a Wi-Fi technology, among other technologies not explicit listed herein.

The positional information may then be used as inputs to the index system to select a content element. As an example, the user may reach a decision node from current content that prompts them to "walk to the other side of the space". When the user reaches the appropriate spatial position the index system would then register the spatial inputs and present the user with a content element e.g. "great! You've reach the right spot". Alternatively, if the user moves to a spatial location other than intended, the spatial inputs to the index system may select alternative content, e.g., "You're not there yet, try again".

Further, the spatial position input may be used asynchronously such that the content does not reach a decision node. Instead, a change in the spatial position input autonomously invokes the index system and thereby determines a next content element to be played.

Specifically, as shown in FIG. 43, a first user 102A may be wearing a first wearable device 104A and a second user 102B may be wearing a second wearable device 104B. Each of the first user 102A and the second user 102B may be located within the defined space (e.g., the room 184 having the x-dimension 186, the y-dimension 188, and the z-dimension 190). Each of the first wearable device 104A and the second wearable device 104B may be configured to locate its position in the defined space (e.g., the room 184) and a position of other devices or equipment in the defined space (e.g., the room 184) dynamically via the one or more radio positioning technologies. For example, the first wearable device 104A may be configured to locate the position of the second wearable device 104B in the room 184 and the second wearable device 104B may be configured to locate the position of the first wearable device 104A within the room 184.

Furthermore, in relation to the examples of FIG. 42 and FIG. 43, the digital content described herein is managed, distributed, or modified by the position of the other devices or equipment with respect to each other or by the position of the other devices or equipment in the defined space (e.g., the room 184).

As another example, the object 108 comprises the timer mechanism 144 (of FIG. 7 and FIG. 8) that is configured to control a duration of digital content playback. The timer mechanism 144 may be turned such that the object 108 is detected by a Hall sensor 154 of the wearable device 104. In another example, the method to generate inputs to the index system 176 may comprise detecting a movement of a head of the user 102 (as shown in FIG. 52).

In a more advanced implementation, the content flow does not stop at the decision node 176, but rather offers a temporarily limited period in which the user 102 can affect the content flow. There may be two or more possible paths for the user 102 to choose. A default progression of content is executed in the absence of intervention by the user 102. Further, the occurrence of the decision node 176 may be only inferred by the content and is not necessarily presented in the form of a question. As an illustrative example, assume the content comprises a story including the following line, "the character begins to climb a steep and high mountain." The user 102 would then have the ability to choose to go back, keep climbing, or call for help, among others, without specifically prompting the user 102 to select one of those options and without stopping the content flow.

Figure 27:
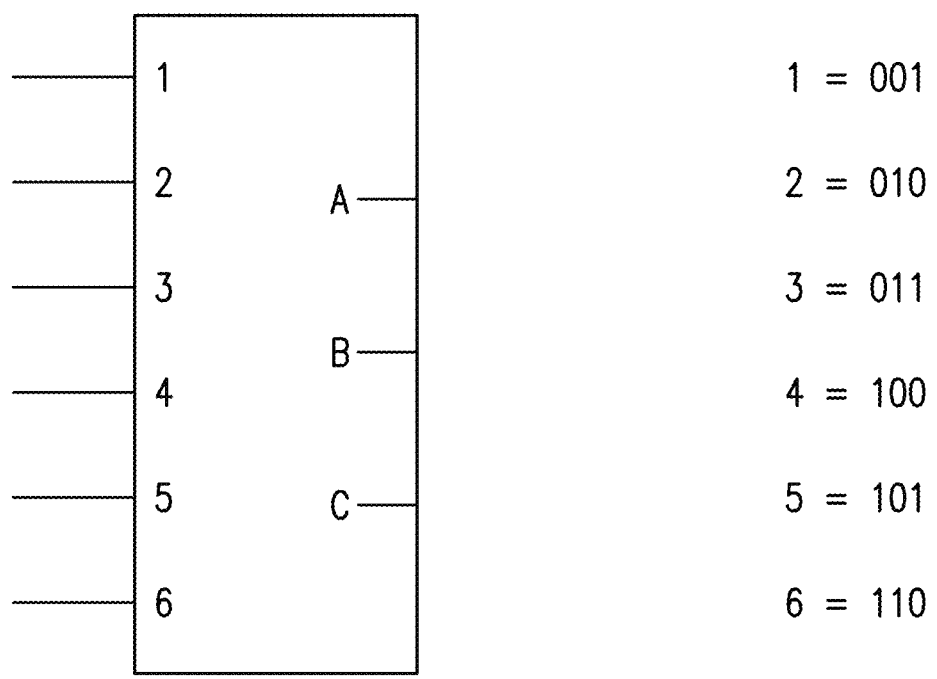
FIG. 27 depicts a perspective view of a schematic diagram of interactive story context indexing, according to at least some embodiments disclosed herein.
Figure 28:
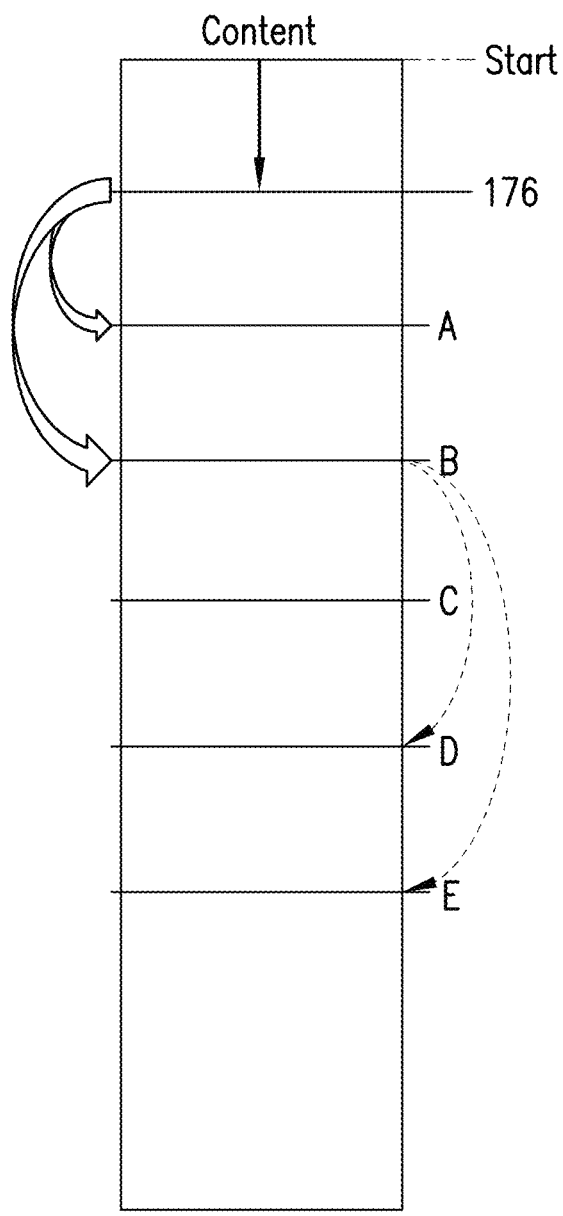
FIG. 28 depicts a perspective view of a schematic diagram of interactive story context indexing, according to at least some embodiments disclosed herein.
Figure 29:
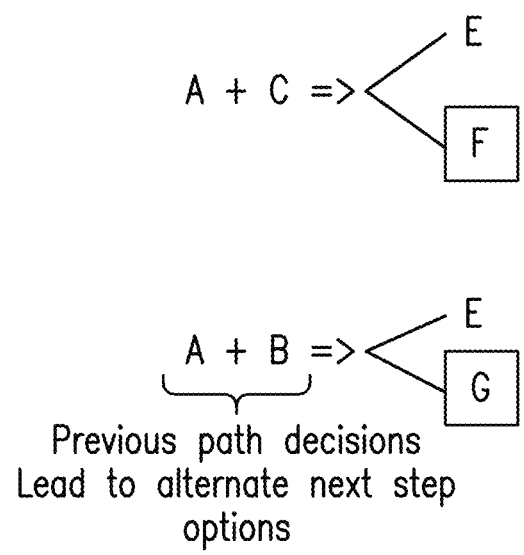
FIG. 29 depicts a perspective view of a schematic diagram of interactive story context indexing, according to at least some embodiments disclosed herein.
Figure 30:
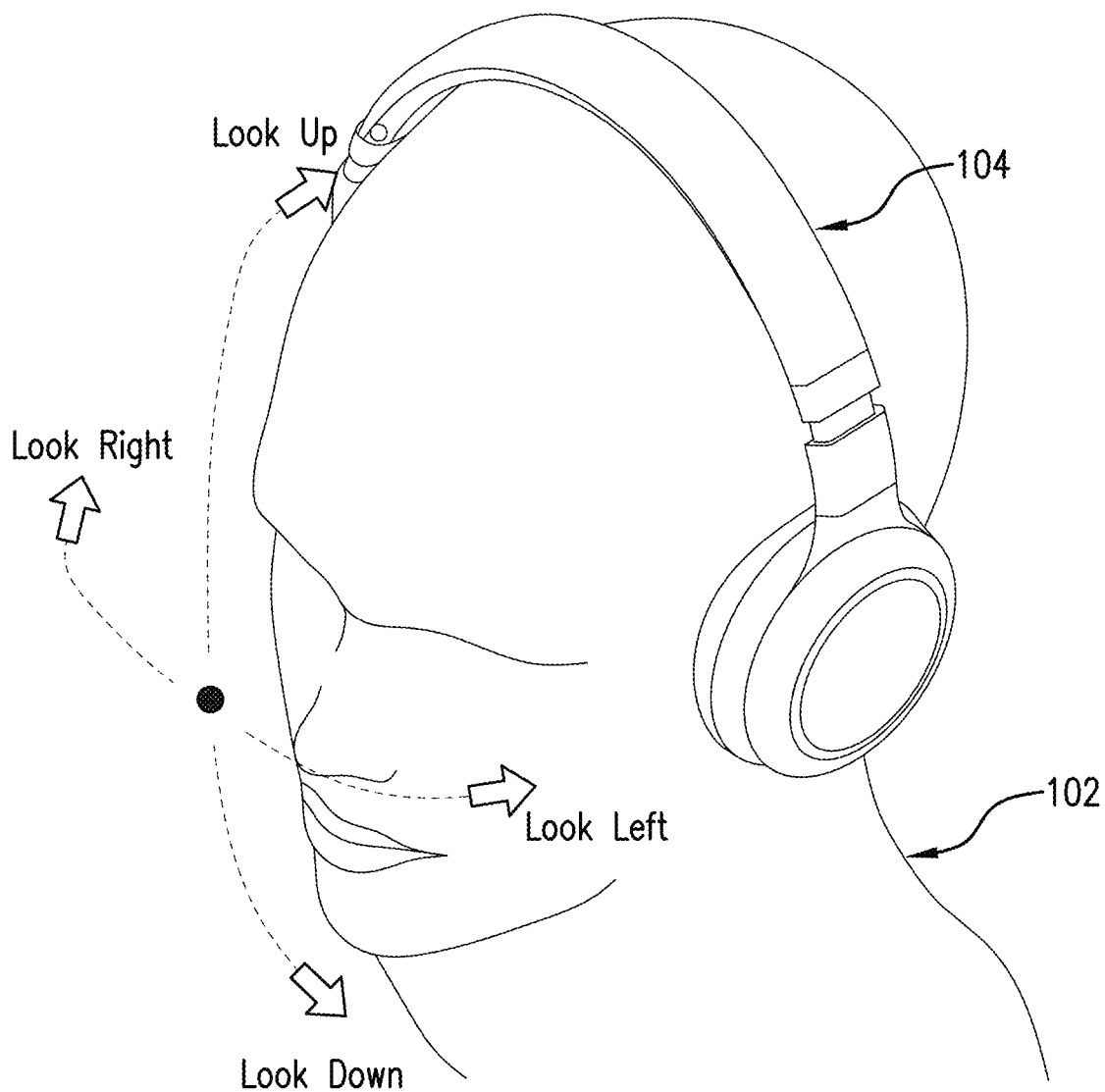
FIG. 30 depicts a perspective view of a schematic diagram of interactive story context indexing, according to at least some embodiments disclosed herein.
Figure 31:
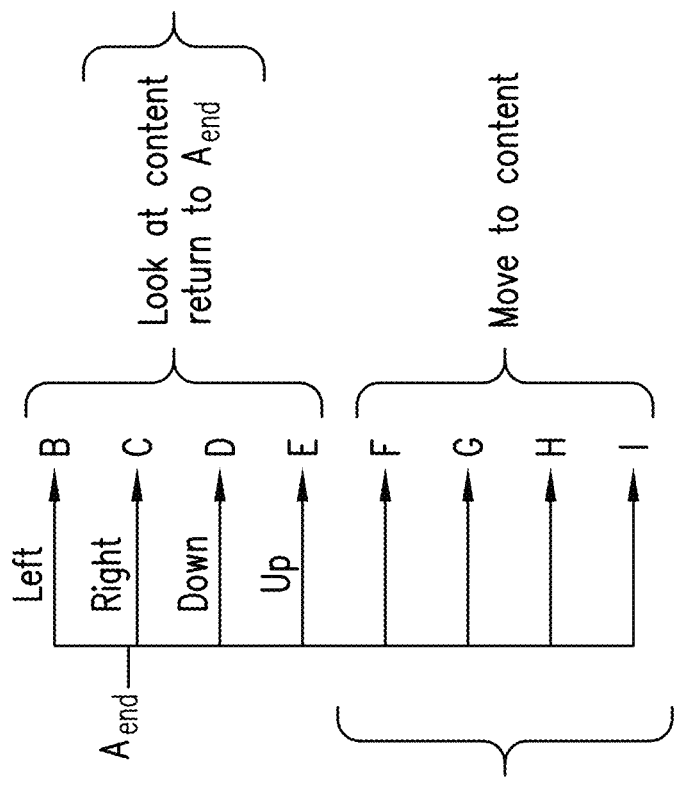
FIG. 31 depicts a perspective view of a schematic diagram of interactive story context indexing, according to at least some embodiments disclosed herein.
Figure 31:
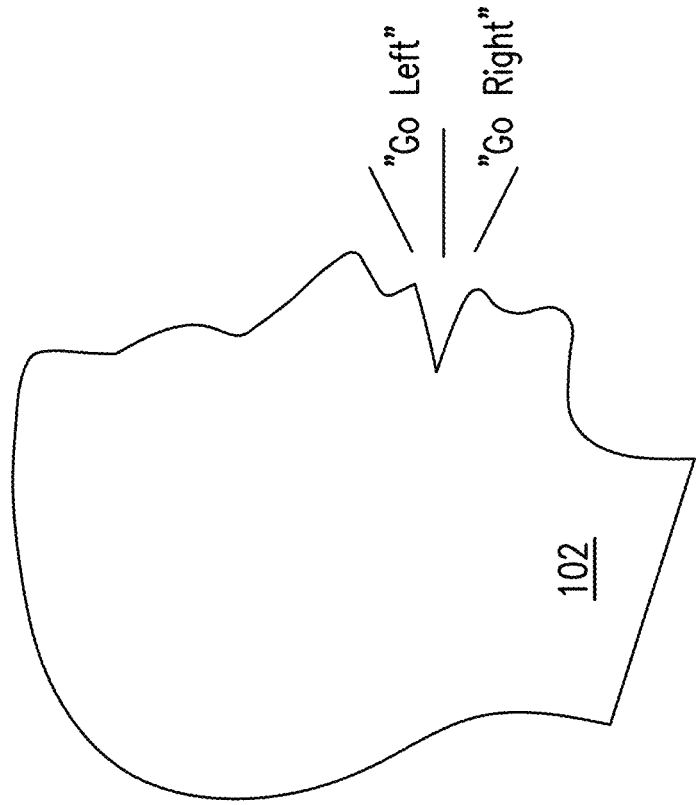

Additionally, the entry points are indexed positions in the content where the content flow can move to, based on the user's decision at the decision node 176. For example, in a story where a character reaches a river, there may be entry points for the following: (1) use the bridge to cross the river, (2) swim across the river, and/or (3) use the boat to row across the river, among others. Entry points may be referenced by a simple sequential set of numbers, such as those shown in FIG. 27, and the reference number is then associated with a physical memory offset, or filename.

Figure 51:
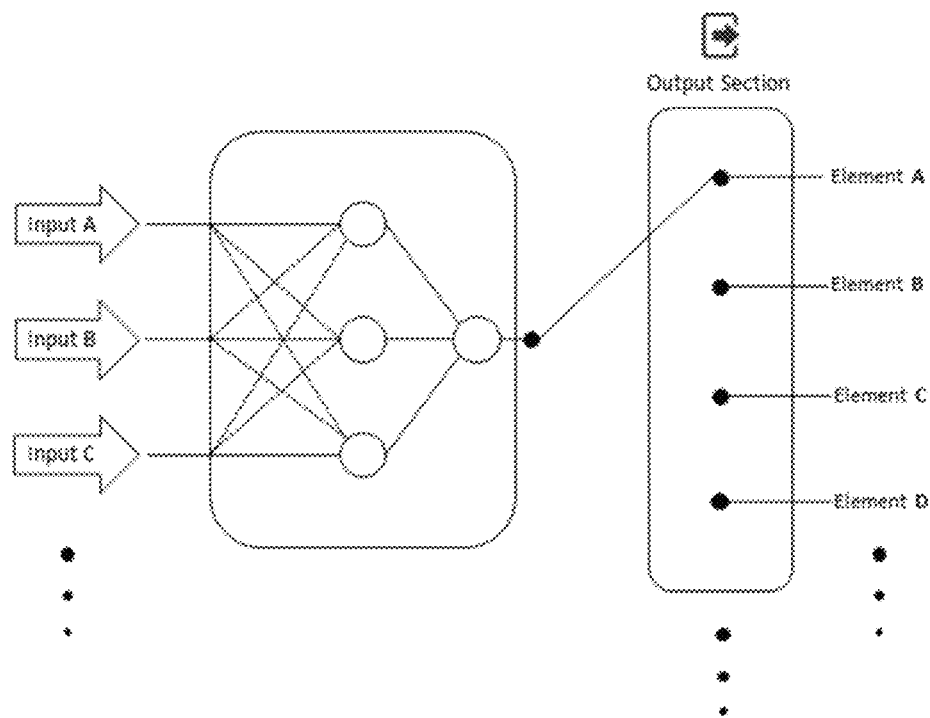
FIG. 51 shows a logic network in which multiple inputs are used to produce an output selection.

Logic is a component of the indexing system that provides a mechanism for dynamic changes to the content flow. The logic system may function in a similar fashion to a fuzzy logic or neutral network system. That is, the corollary of multiple inputs may determine an output. As an illustrative example of reaching the river, if the user 102 or another user operating in a shared environment has already used the boat to attempt a river crossing, the weighting matrix has the related coefficient set to zero and a subsequent approach to the river crossing does not have the "use the boat" entry point as an option at that decision node 176. At each decision node 176 in the content flow, the user's decision input causes the modification of a weighting matrix (such as by setting or clearing a binary value) so that the presentation of future decision nodes and associated entry points is changed dynamically by the user's historical decisions. FIG. 51 illustrates the logic function 540 of the indexing system taking a multiple of inputs to generate an output.

It should be appreciated that, as described herein, the user input may comprise: a gesture input, an audio input, a tactile input, and/or an absolute or relative special position input, among others. Specifically, FIG. 52 depicts an example gesture input (e.g., the user tilting their head while wearing the wearable device 104).

When these components are used in combination, the system functions in the following manner. First, a collection of content is provided that consists of content elements referenced by entry points. Each content element terminates with the decision node 176. When the user 102 begins a content element given by an entry point, a computation is made using the weighting matrix to resolve a list of possible entry points (including a default entry point) available to the user 102 when the decision node 176 at the end of the content element is reached. The user's decision input is used to modify the weighting matrix such that future outcomes (e.g., entry points available at a decision node) are altered. As a result, the user's progression through the content is determined based on previous decisions. Further, each time the user 102 begins a story, the content flow of the story may be modified based on previous passes through the content. As such, these components allow the user to jump to different parts of the content to build an interactive story.

Figure 32:
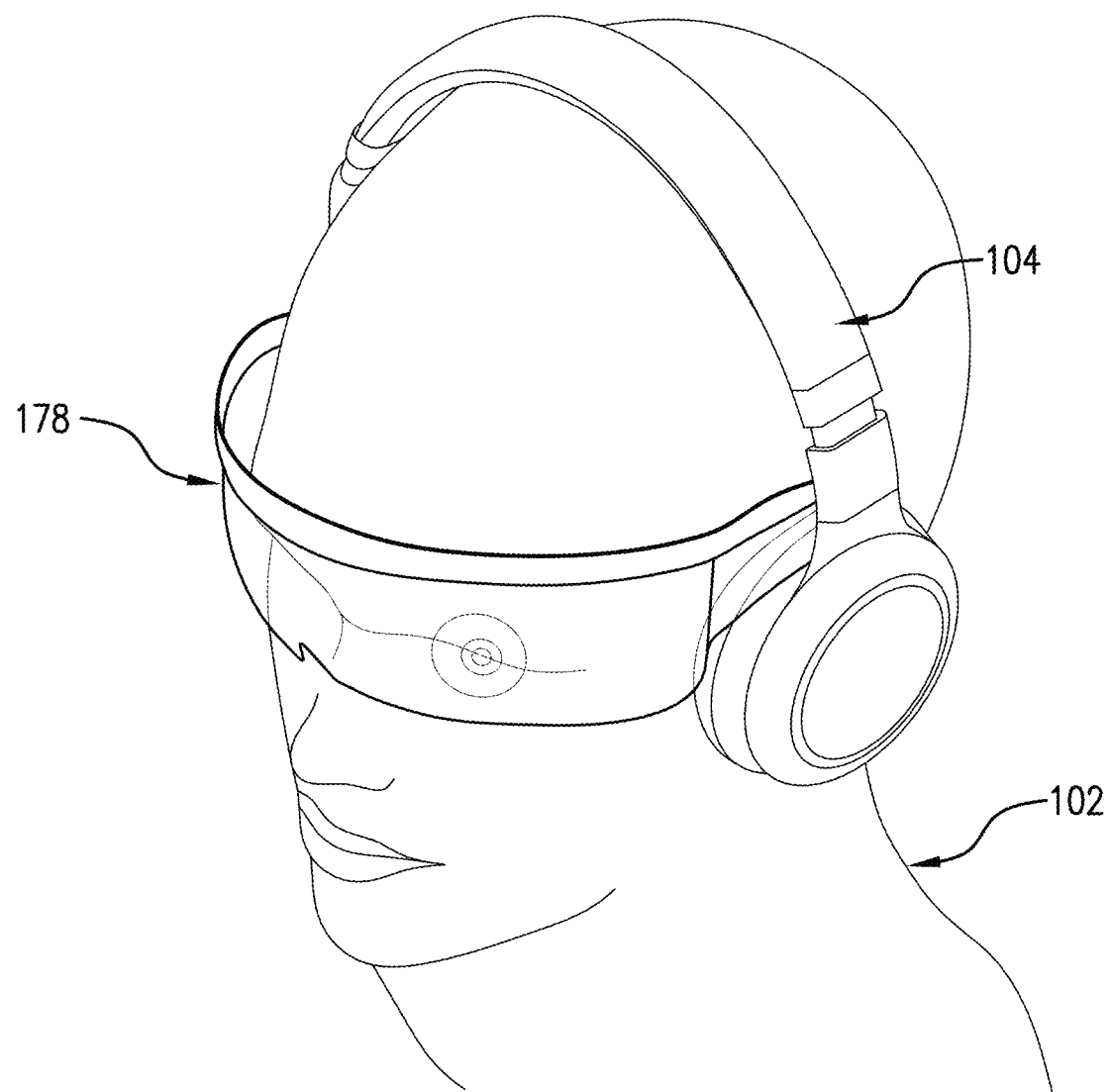
FIG. 32 depicts a perspective view of a schematic diagram of a first example of two or more users interacting with digital content via a connection to a wearable device (e.g., smart glasses), according to at least some embodiments disclosed herein.
Figure 33:
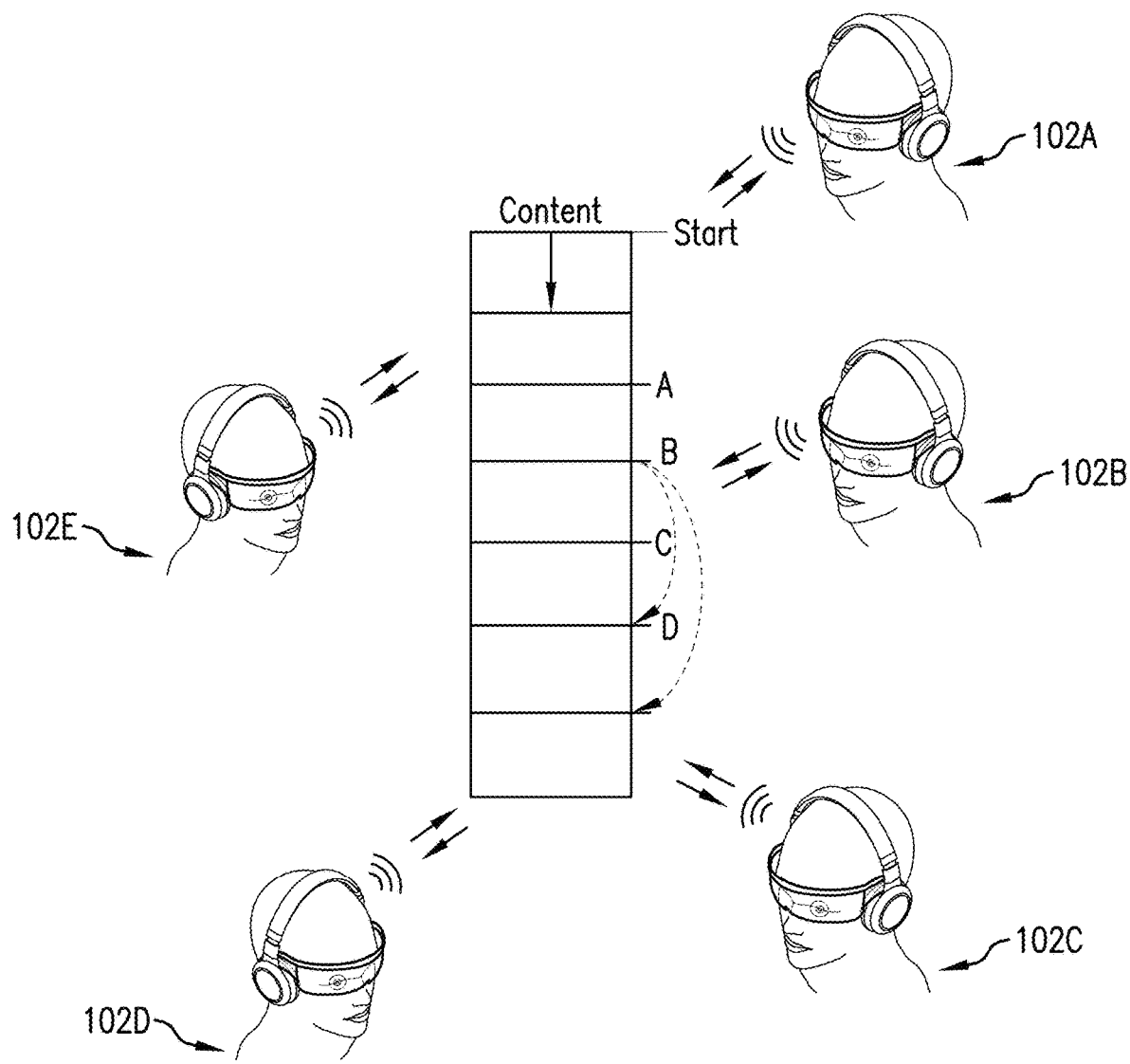
FIG. 33 depicts a perspective view of a schematic diagram of a first example of two or more users interacting with digital content via a connection to a wearable device (e.g., smart glasses), according to at least some embodiments disclosed herein.

Moreover, in examples, one or more users may interact with the digital content via a connection to the wearable device 104. FIG. 32 and FIG. 33 depict perspective views of schematic diagrams of a first example of two or more users (e.g., a first user 102A, a second user 102B, a third user 102C, a fourth user 102D, and a fifth user 102E) interacting with digital content via a connection to a wearable device 178 (e.g., smart glasses). In embodiments, each user may interact individually with the digital content. In other embodiments, a plurality of users may interact with the digital content in cooperation with some or all of the other users.

Figure 34:
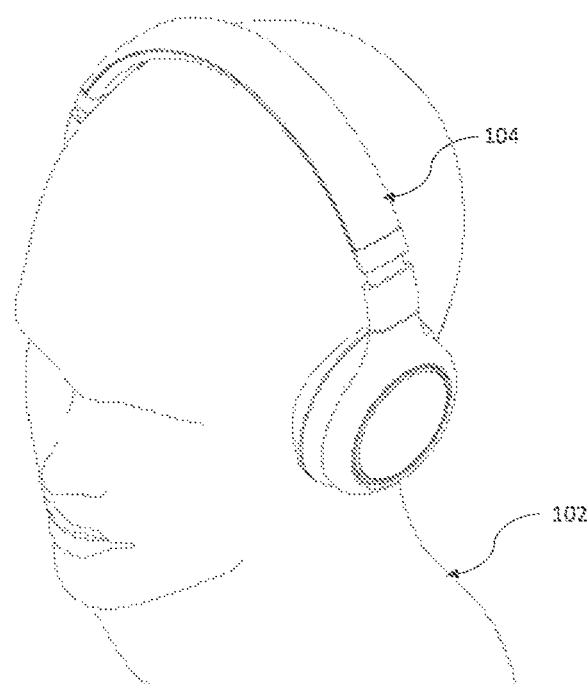
FIG. 34 depicts a perspective view of a schematic diagram of a second example of two or more users interacting with digital content via a connection to a wearable device (e.g., headphones), according to at least some embodiments disclosed herein.
Figure 35:
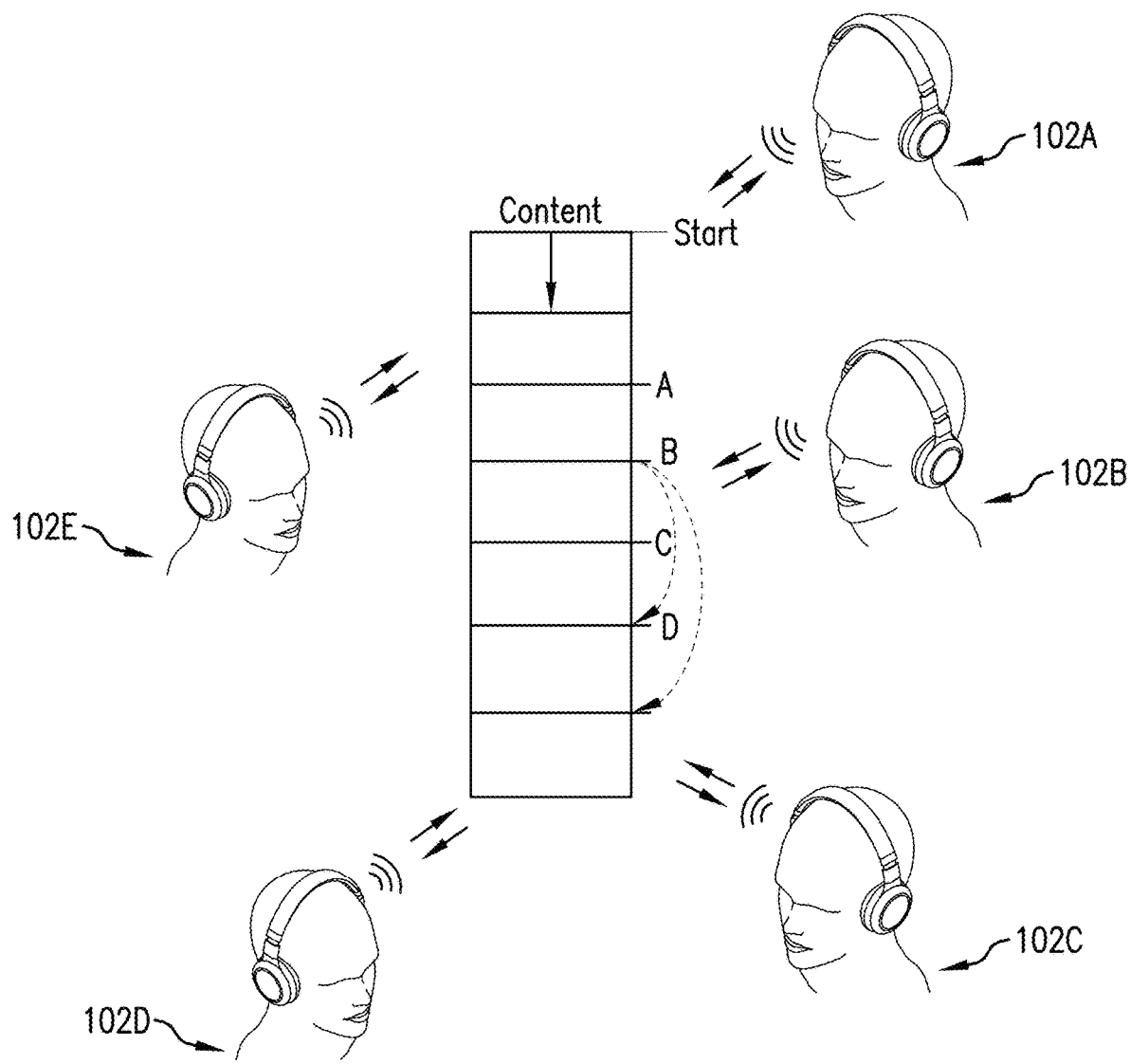
FIG. 35 depicts a perspective view of a schematic diagram of a second example of two or more users interacting with digital content via a connection to a wearable device (e.g., headphones), according to at least some embodiments disclosed herein.
Figure 36:
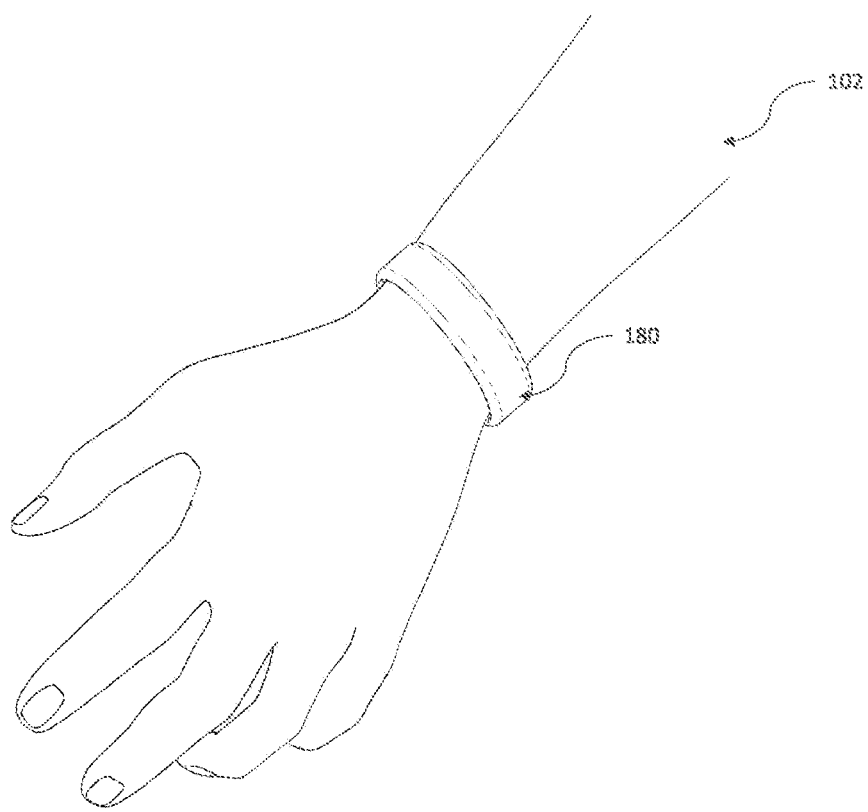
FIG. 36 depicts a perspective view of a schematic diagram of an ancillary device worn by a user, according to at least some embodiments disclosed herein.

FIG. 34 and FIG. 35 depict perspective views of schematic diagrams of a second example of two or more users (e.g., the first user 102A, the second user 102B, the third user 102C, the fourth user 102D, and the fifth user 102E) interacting with digital content via a connection to a wearable device 104 (e.g., headphones). In a first illustrative example, the connection described comprises a wired daisy-chained connection. In a second illustrative example, the connection comprises any wireless communication method. It should be appreciated that in some examples, the connection comprises future wireless technologies not explicitly described herein.

Figure 37:
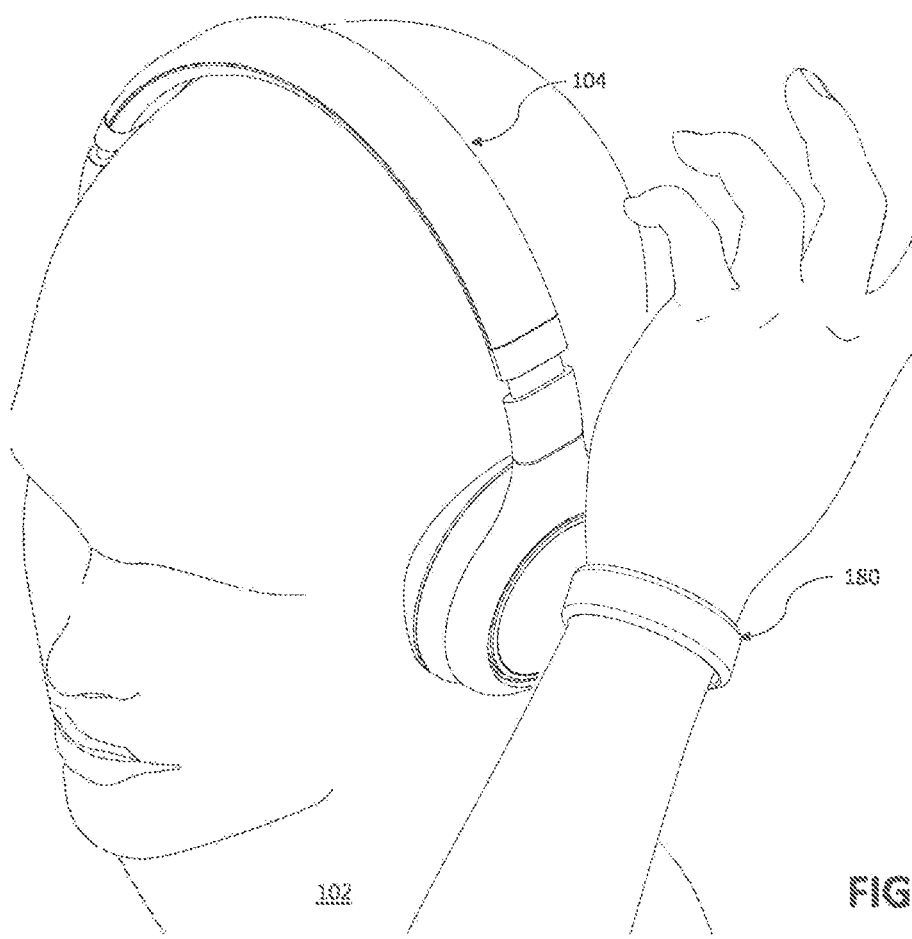
FIG. 37 depicts a perspective view of a schematic diagram of an ancillary device coming into contact with a wearable device of a user, according to at least some embodiments disclosed herein.

In another embodiment, and as shown in at least FIG. 36, FIG. 37, FIG. 38, and FIG. 39, the system described herein may comprise an ancillary device 180. The ancillary device 180 may be worn by the user 102. Moreover, the ancillary device 180 may be part of a body area network (BAN), a personal area network (PAN), or may otherwise function in conjunction with the wearable device 104, as shown in FIG. 37. As described herein, the BAN is a wireless network of wearable computing devices, such as the wearable device 104. Further, as described herein, PAN is a computer network for interconnecting electronic devices within a workspace of the user.

It should be appreciated that the ancillary device 180 incorporates a capacitive or a galvanic coupling functionality. Moreover, the ancillary device 180 is configured to communicate by touch via skin or other material contact to another capacitive or galvanic coupling enabled device or through near-field communication. As an illustrative example, and as shown in at least FIG. 36, FIG. 37, FIG. 38, and FIG. 39, the ancillary device 180 is a wearable bracelet that comprises a Bluetooth Low Energy (LE) functionality, a radio frequency identification (RFID) chip, and a galvanic coupling technology such that the ancillary device 180 may communicate by touch to another capacitive or galvanic coupling enabled device (e.g., the wearable device 104, as shown in FIG. 37) or through near-field communication.

As described herein, "Bluetooth Low Energy" or "Bluetooth LE" is a wireless personal area network technology aimed at applications in the healthcare, fitness, beacons, security, and home entertainment industries. When compared to classic Bluetooth, Bluetooth LE is intended to provide considerably reduced power consumption and cost while maintaining a similar communication range. Mobile operating systems including iOS, Android, Windows Phone and BlackBerry, as well as macOS, Linux, Windows 8 and Windows 10, natively support Bluetooth LE.

Figure 38:
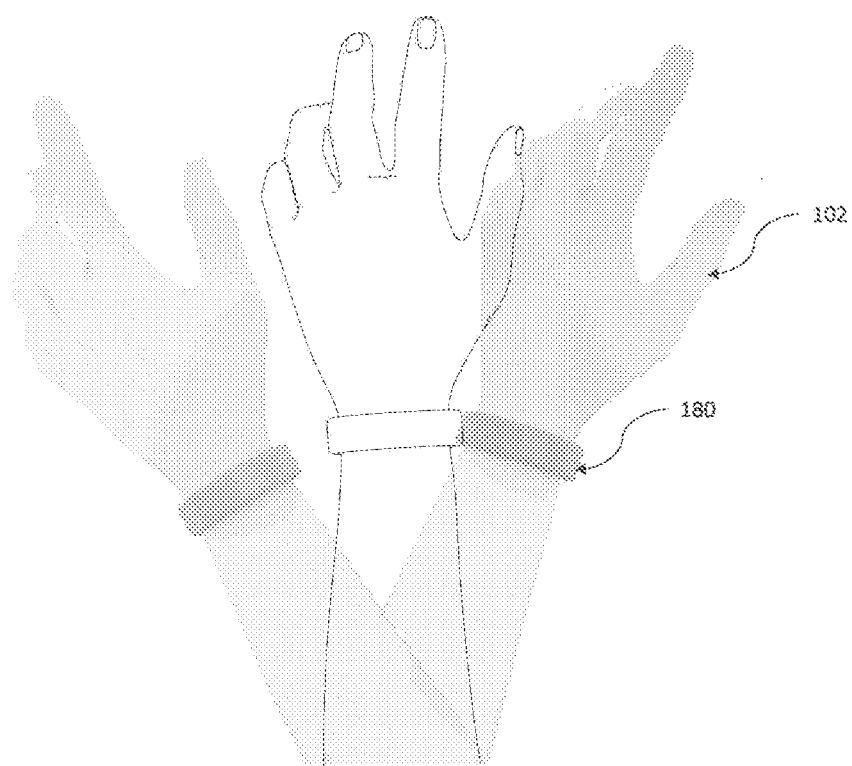
FIG. 38 depicts a perspective view of a schematic diagram of a hand gesture or movement occurring while a user is wearing an ancillary device, according to at least some embodiments disclosed herein.
Figure 39:
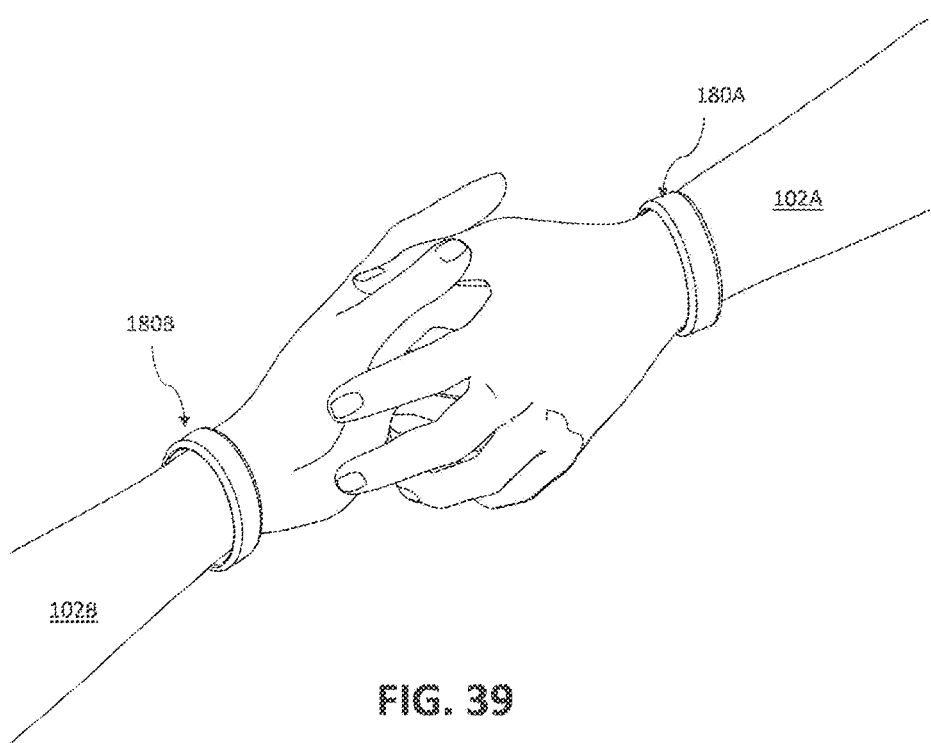
FIG. 39 depicts a perspective view of a schematic diagram of a handshake that occurs between a first ancillary device worn by a first user and a second ancillary deice worn by a second user, according to at least some embodiments disclosed herein.
Figure 40:
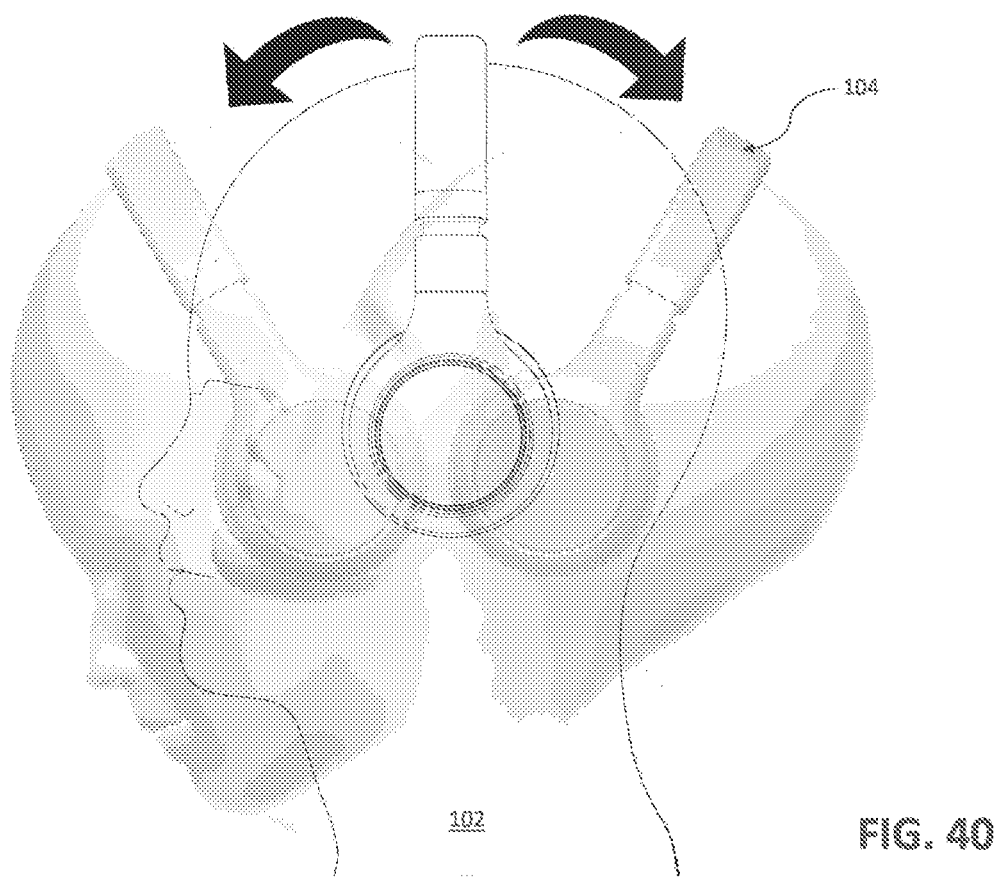
FIG. 40 depicts a perspective view of a schematic diagram of a head nodding movement occurring while a user is wearing a wearable device, according to at least some embodiments disclosed herein.

FIG. 38 depicts a hand gesture or movement occurring while the user 102 is wearing the ancillary device 180. Furthermore, FIG. 39 depicts a first ancillary device 180A worn by a first user 102A and a second ancillary device 180B worn by a second user 102B, where the first ancillary device 180A and the second ancillary device 180B are configured to communicate by touch via skin or other material contact with one another or through near-field communication. It should be appreciated that though the ancillary device 180 is depicted as a wearable bracelet, the ancillary device 180 is not limited to such and other configurations of the ancillary device 180 are contemplated herein.

Figure 41:
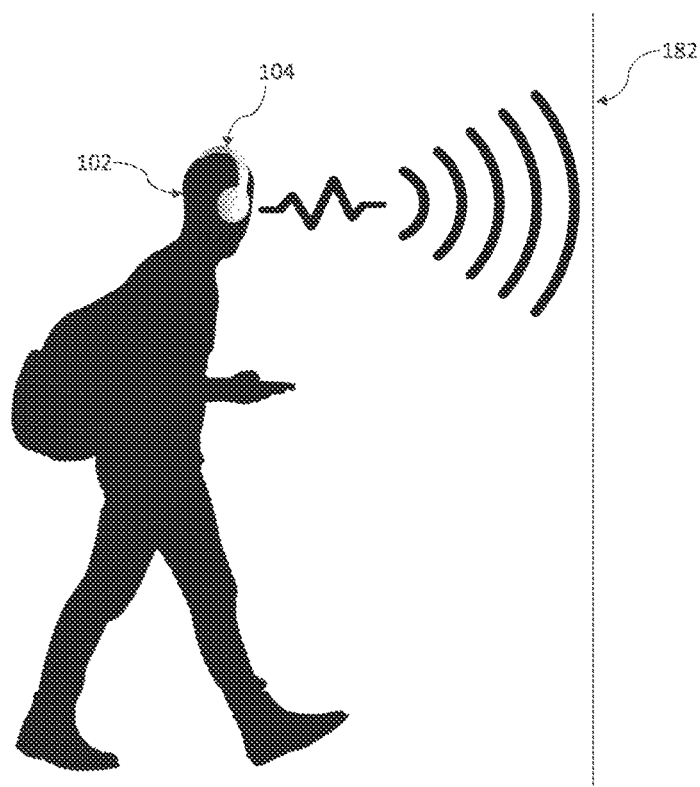
FIG. 41 depicts a perspective view of a schematic diagram of a user wearing a wearable device that comprises one or more proximity sensors, according to at least some embodiments disclosed herein.

In further examples, and as shown in at least FIG. 41, the wearable device 104 comprises one or more sensors configured to detect a physical location in relation to other physical objects located within a close proximity. In examples, each of the one or more sensors may be an ultrasonic distance sensor, a laser distance sensor, an infrared distance sensor, a radio frequency identification (RFID) sensor, or a radar sensor, among other sensors not explicitly listed herein. Specifically, as depicted in FIG. 41, the wearable device 104 worn by the user 102 may comprise one or more proximity sensors that are configured to detect a distance from the wearable device 104 (and thus the user 102) to an object, such as a wall 182.

As previously described, an object 108 may interface directly with a receiving portion 142 of a wearable device 104 using near field communication (NFC). In embodiments, the object 108 may be received by and affixed to the receiving portion 142 of the wearable device 104 via a mechanical means or a magnetic means, or any other appropriate means not explicitly described herein. The receiving portion 142 of the wearable device 104 may also include one or more speakers and/or other sensory outputs.

Figure 44:
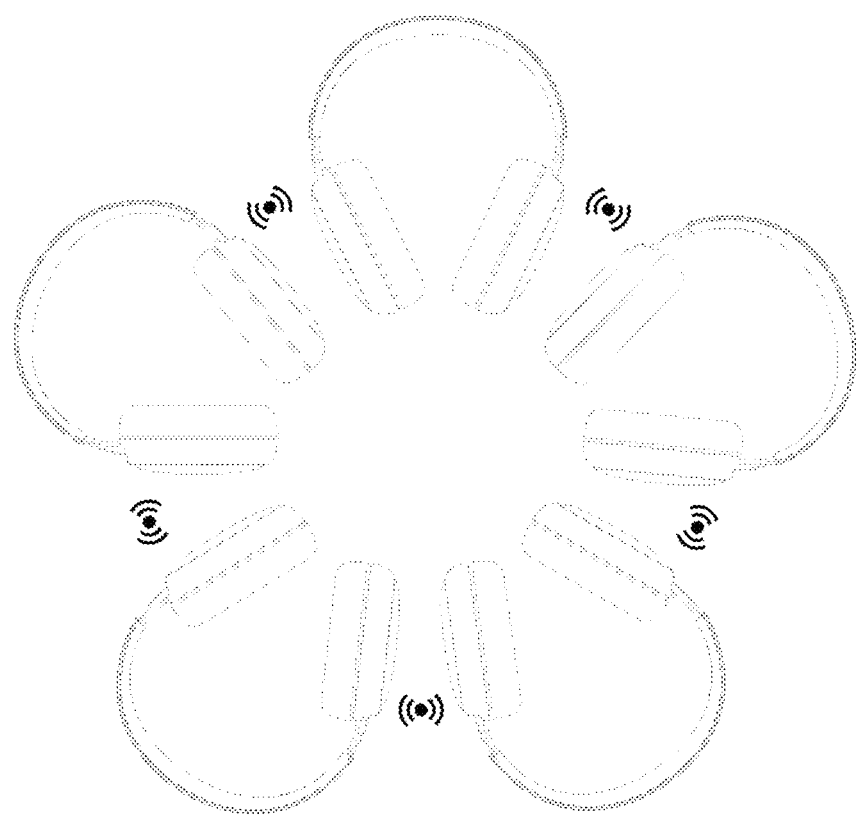
FIG. 44 illustrates a configuration in which multiple parties form a network and communicate with each other.

However, in other embodiments, other arrangements of system elements and users may be used. For example, multiple objects 108 can be received and affixed to a device 104. Moreover, one or more such objects may include their own receiving portion and affixing method, or the wearable devices 104 may themselves may comprise respective receiving portions. FIG. 44 illustrates a configuration in which multiple parties form a network and communicate with each other, using any conventional wired or wireless communications and network protocols appropriate for the usage environment and scenario in which they are operating.

Figure 45:
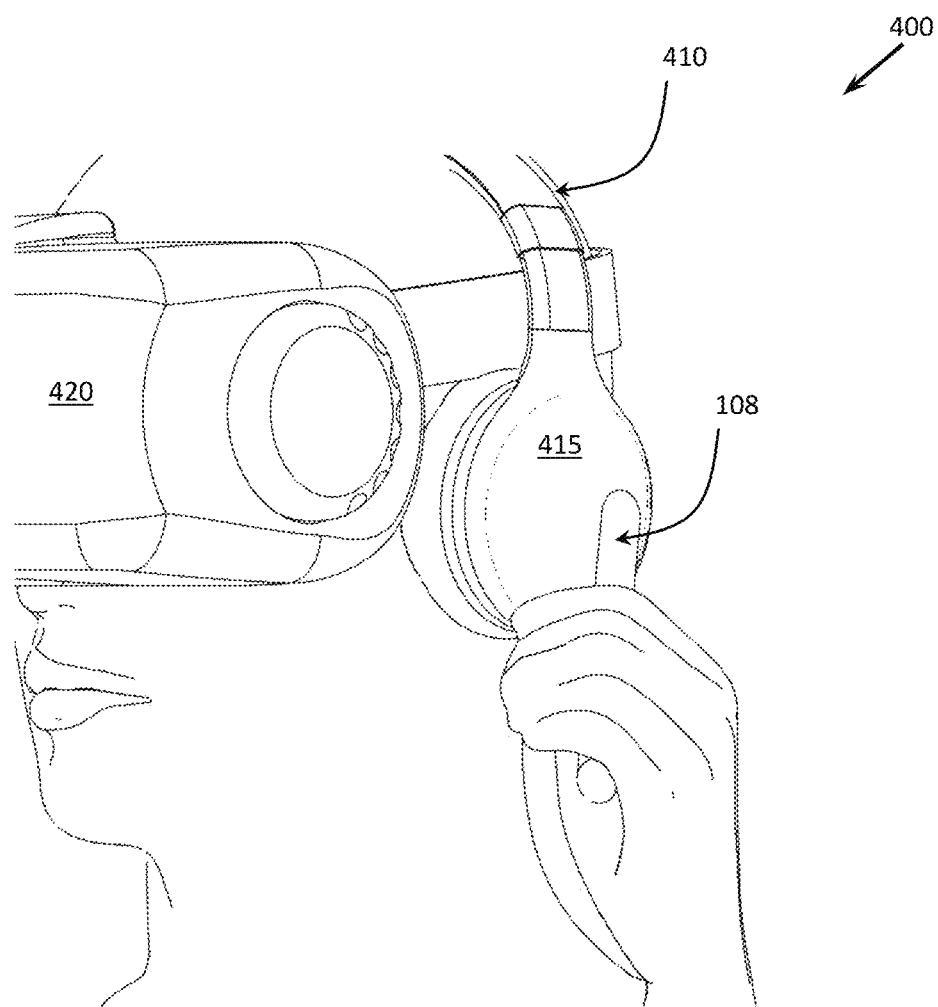
FIG. 45 illustrates a user wearing a virtual reality (VR) or enhanced reality (ER) headset.

FIG. 45 illustrates a user 102 wearing a virtual reality (VR) or enhanced reality (ER) headset 400 that includes over the ear headphones 410 and a personal visual display 420. An earpiece 415 of the wearable device 400 comprises an electronic receiver 158, as was depicted in FIG. 15. As before an object 108, here in the form of a wand, comprises an electronic transmitter and a battery. In this embodiment, when the object 108 is brought into proximity of the earpiece 415, the identifier associated with the digital content and the security code stored in object 108 are transferred to the headset 400.

Figure 46:
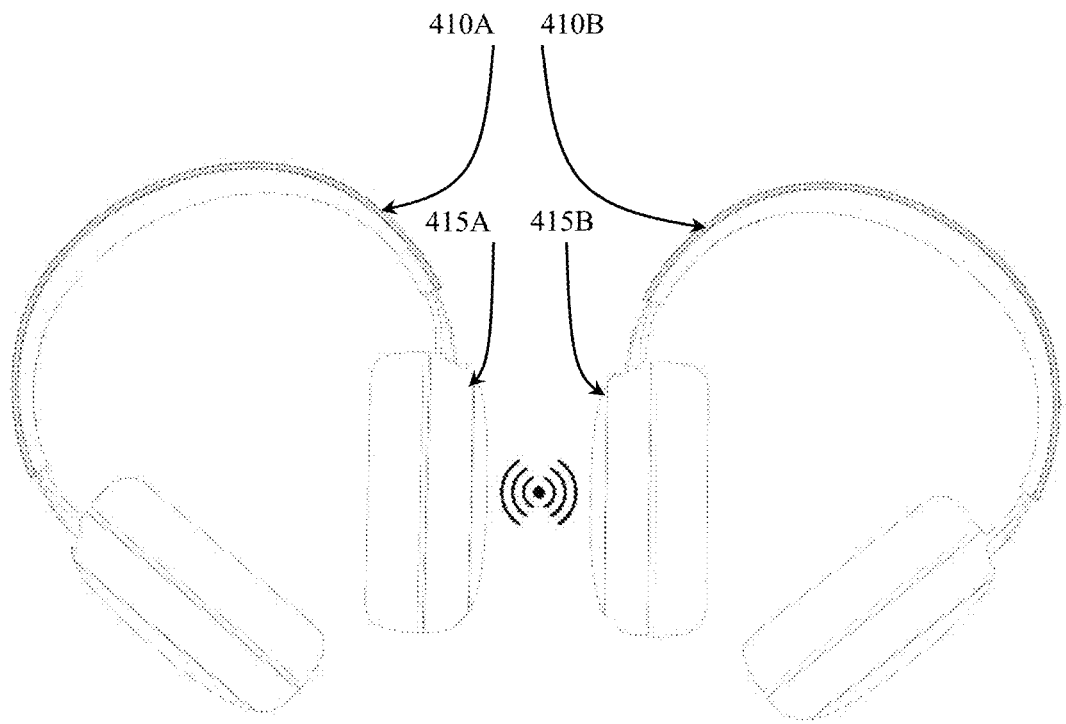
FIG. 46 shows two sets of headphones configured to communicate wirelessly with the other when brought into close proximity to each other

FIG. 46 shows two sets of over the head earphones 410A, 410B, each configured to communicate wirelessly with the other when brought into close proximity to each other. In this embodiment, an earpiece 415A, 415B of each set of headphones contains a transmitter, a receiver, a data storage device, and a battery coupled to each. They are configured to detect when they are brought into proximity with each other, and to transfer at least some of their respective stored data between them.

In embodiments, an object containing a passive RFID tag interacts with a device containing an active RFID tag reader, wherein the device reads an RFID tag of the object by bringing the object into close proximity with the device, so that near field communication (NFC), Bluetooth, or the like between the object and the device may function. The object may be any convenient type of a first device comprising an RFID tag, which is brought into close proximity of any second convenient type of a second device comprising an RFID tag reader, to read the information in the tag. The first and second types of device may be the same type or different types. In embodiments, a single device may comprise both an RFID tag and an RFID reader, or may otherwise include both of their functionalities in any convenient alternative configuration.

Figure 47:
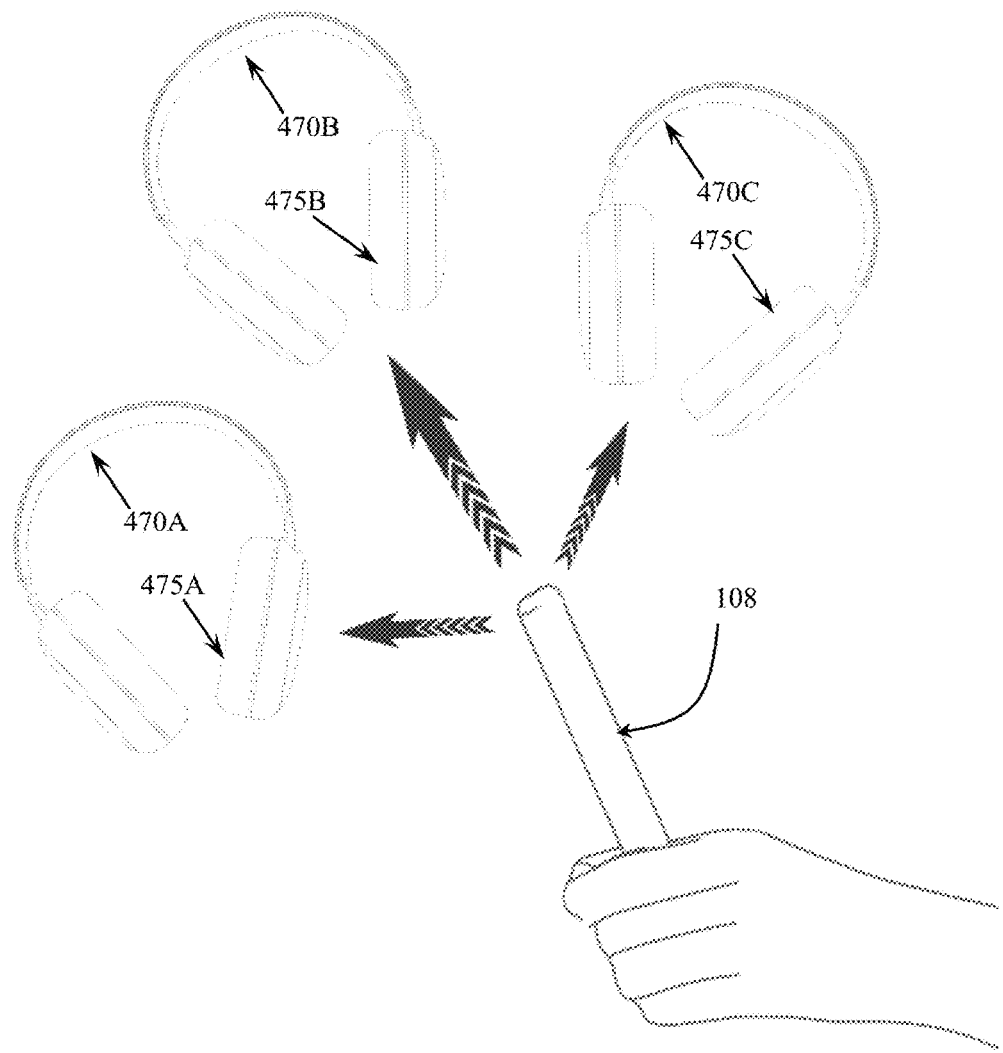
FIG. 47 shows three sets of headphones interacting with an object, in this embodiment depicted for illustrative purposes as a wand. The object may be configured to allow any or all of the headphones or other appropriately configured devices, when the object is brought into close proximity with the them, to obtain digital content, or to be authorized to form a LAN together, or to receive an index decision node input provided by the object, or to authorize the headphone(s) to enable or activate functions or features of the device, or to store digital content on the device authorized to activate.

In embodiments, the object may interact with multiple devices. FIG. 47 shows a single object (a wand) that includes an RFID tag. When the wand is brought in proximity to one or more user devices, those proximate devices respectively interact with the wand to read the RFID tag in the wand.

In the embodiment illustrated in FIG. 47, three sets of headphones 470A, 470B, 470C are shown. Each contains a respective earpiece 475A, 475B, 475C containing a battery coupled to a receiver, which may be an active RFID reader. The receiver is configured to detect an object when brought into close proximity, such as a wand 108. The object (wand) contains a data storage device having data stored therein, which may be included in a passive RFID tag. As shown, the data in the wand is transferred to each of the earpieces when it is brought into their respective proximities. The data transferred may include an identifier associated with secured digital content, and a security code needed to obtain the digital content. After the identifier and the security code are transferred to the respective headphones, the user wearing the headphones may activate audio play of the digital content in any convenient manner.

Multiple objects can be read by multiple devices to authorize digital content download from the cloud based server, and/or to authorize uploading of content to a cloud based server, and/or to authorize upload or download (i.e., sending or receiving) of content between devices. The devices may also be configured to input data into their respective indices, to include but not be limited to acting as a decision node, to input into the index to authorize content playback, and/or to affect the order of the index content blocks. The RFID tag of an object may also be used to active hardware and software functions of one or more of the devices, such as allowing augmented reality display, and/or multiplayer usage of a game, and/or the connection or inclusion of an ancillary peripheral device. Other feature and function options may additionally or optionally be provided and/or allowed.

FIG. 48 illustrates an example embodiment of an index system 480 in which any appropriate kind of digital content is arranged as a set of content elements 485. The presentation of one or more of the content elements 485 is controlled by the indexing system 480. The index system 480 manages the selection of content elements played to the user by mapping a set of inputs to an output that selects a specific content element.

One or more of the content elements 485 may be retrieved from a cloud service or other source, either singly or as a group. FIG. 48 shows such digital content as a collection of content elements 485. The content elements may be retrieved from a cloud server or another paired device on demand. Consequently the content elements 485 can be updated and/or changed dynamically to give the user an ever evolving experience.

FIG. 49 shows a simple implementation of an indexing system 480, wherein each content element A, B, C, D, . . . provides a logical input to the indexing system, and the indexing system then generates a logical output to point to the next content element to be played. More generally, the indexing system operates as a logic system to map various inputs to respective specific outputs, the outputs being respective content elements to be played next.

As illustrated in FIG. 50, various inputs may include a content element just finished, or gesture inputs, or other inputs from the user. Inputs may additionally or alternative be determined based at least in part on previous selections, positional information from an UWB system, proximity of one or more physical objects (such as other headphones, wands etc.), and/or an interaction with a RFID tag. Some degree of randomization may also influence a choice of an output.

Further, the indexing system may use a logical network to determine a content element to play next based on a multiple of inputs. This is illustrated in FIG. 51, which shows a logic network in which multiple inputs are used to produce a output selection.

In one example of the behavior of the indexing system, a set of content elements may be mapped to be played in sequence. If so, when the indexing system receives an input that constitutes or includes the end of a content element or series of elements, it may then select the next element in a predetermined sequence.

FIG. 52 illustrates another example in which a particular content element ends by giving the user a choice of options. For example, content elements may include go left or go right at a fork in a road. The user may then provide a gesture input (or other type of input) that the index system uses to determine an appropriate next content element to play. Of course, the next content element to play may be associated with the user's choice.

The indexing system may also incorporate additional logic that may modify the output. For example, a content element may play the following: "you reach a bridge that spans across the river, do you cross the bridge or continue along the river side?". In one instance the user may choose to cross the bridge and be provided with the following content: "the bridge creaks and groans and just as you reach the middle its collapses and you fall into the river". However, on another occasion the choice to cross the river may produce the content "the bridge is wobbly and unsteady but finally you reach the other side". The indexing system here is producing outputs that are not fixed, but are dynamic. In this example the output of the indexing system resulting from crossing the bridge may come from a selection that is at least partially random, and/or may be at least partially computed from factors such as the number of times the bridge cross option has been used previously. For example, the 'bridge' may weaken with each use and finally collapses.

In embodiments, the indexing system supports a multiple user environment. In this case the indexing system responds to input from the shared environment. In a multiple user environment the index system may maintain synchronization with all users, or one or more users may operate independently of the others, or a combination of these may be configured.

For example, a content element may prompt a user to pass a token to another user. The token may be a 'wand', and once the wand is passed to another user the indexing system would respond accordingly, recognizing that the wand is held by the other user.

Another example is a shared environment in which a game of hide and seek is played. At the outset of the game the indexing system recognizes all users and may provide the 'finder' with content elements indicating the hidden status of other users. As hidden users are found, the indexing system then excludes content elements related to them because they are out of the game.

In one example configuration, when a new user enters a shared environment, one or more content elements related to that user become available to all users. Such new users may join a shared environment by means of proximity detection, NFC communication, or other methods not explicitly described.

Figure 53:
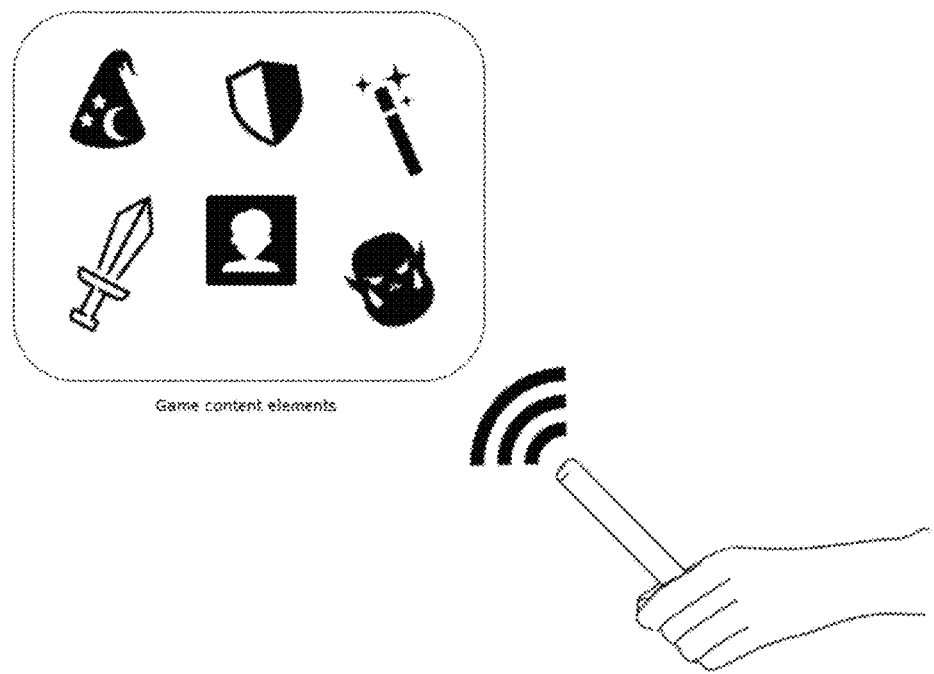
FIG. 53 illustrates the object in the form of wand being used to active content elements in the device where the content elements are game related.

FIG. 53 illustrates the basic operation of an exemplary indexing system. Each block represents a content element. At the end of each block the indexing system is invoked and determines which block to be played next. The arrows show that the next block may or may not be the next element in a sequence, as determined by the element selected by the indexing system.

Aspects of the present invention are described herein with reference to block diagrams of methods and systems according to embodiments of the invention. It will be understood that each block and combinations of blocks in the diagrams, can be implemented by the computer readable program instructions.

The block diagrams in the Figures illustrate the architecture, functionality, and operation of possible implementations of systems and methods according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

As described herein, a wired, wireless, and/or touch connection methods or technologies may be used. Example wireless connection methods may include a Bluetooth connection, a radio broadcast technology, a mesh system, an UWB connection or a Wi-Fi connection, among others not explicitly listed herein. Furthermore, touch connection mechanisms or methods include galvanic or capacitive coupling by skin contact or another mechanism. Additionally, one or more of these connection methods or means may operate simultaneously.

Another embodiment of the invention provides a method that performs the process steps on a subscription, advertising, and/or fee basis. That is, a service provider can offer to assist in the method steps of downloading or streaming digital content from the server directly into the wearable device. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

Figure 54:
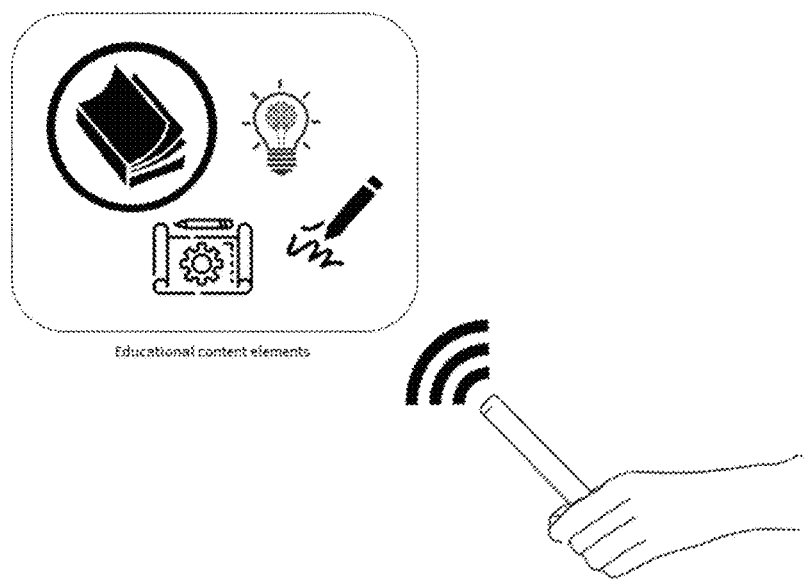
FIG. 54 illustrates the object in the form of wand being used to activate content elements in the device where the content elements are educational related.
Figure 55:
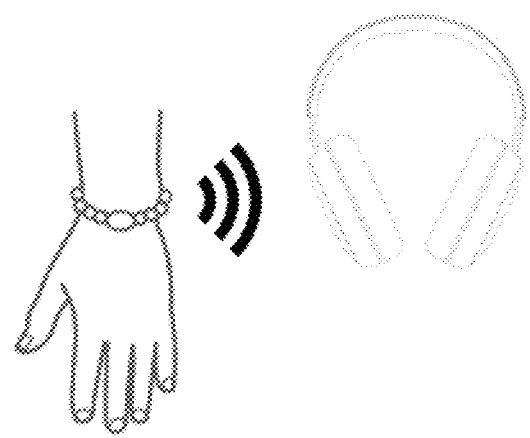
FIG. 55 illustrates a peripheral device with an RFID tag being brought into proximity to a device such that the device recognizes and authorizes the use of the peripheral in the system where the peripheral is a bracelet.
Figure 56:
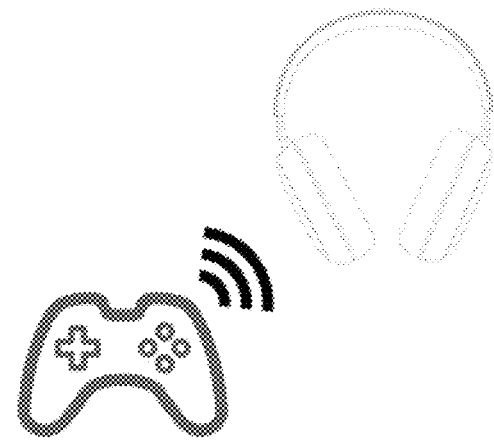
FIG. 56 illustrates a peripheral device with an RFID tag being brought into proximity to a device such that the device recognizes and authorizes the use of the peripheral in the system where the peripheral is a game controller.
Figure 57:
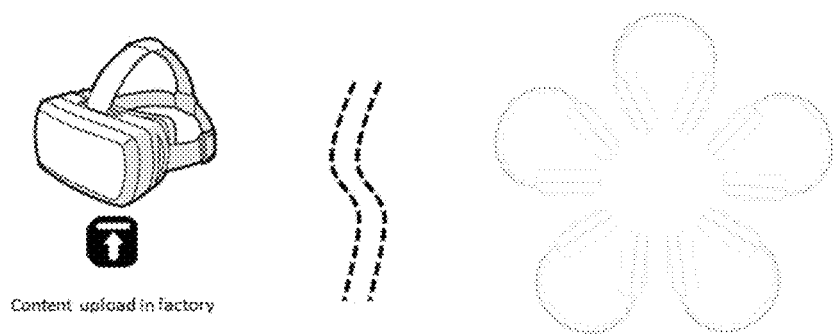
FIG. 57 illustrates a device in the form of a virtual reality headset having digital content uploaded into an index at the factory level.

Another embodiment of the invention has a system of the device and an object where the object includes an RFID tag where the tag is not required to download digital content but provides a variety of other functions as depicted in FIG. 45 when brought into proximity with the device. The object tag read by the device can activate content elements stored in the index of the device, FIG. 54 illustrates gaming content elements, FIG. 55 illustrates educational content elements, as variant embodiments of this invention. Other embodiments of the use of the RFID tag are shown in FIG. 56 and FIG. 57 where the object is in the form of peripheral devices which use the RFID tag to be recognized by the device. Another embodiment of the use of the tag in FIG. 45, is to activate functions and features of the mechanical or software capabilities of the device such as to allow augmented reality features like a heads-up display (HUD) or a licensed true surround audio or voice recognition or diffuse infrared communication.

Figure 58:
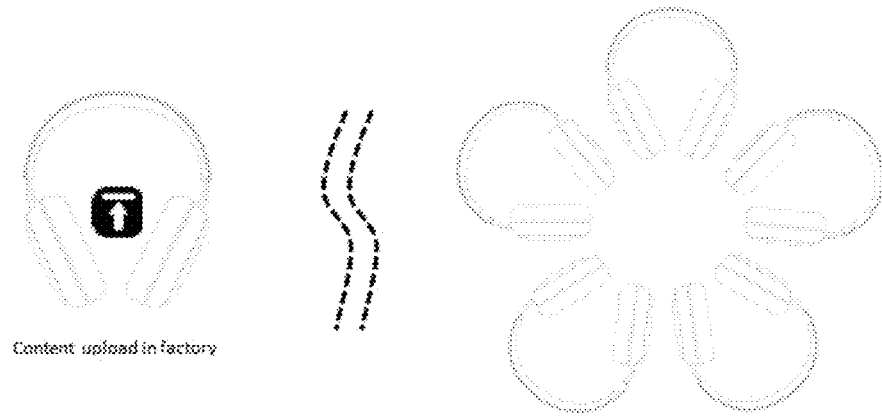
FIG. 58 illustrates a device in the form of a headphone having digital content uploaded in an index at the factory level
Figure 59:
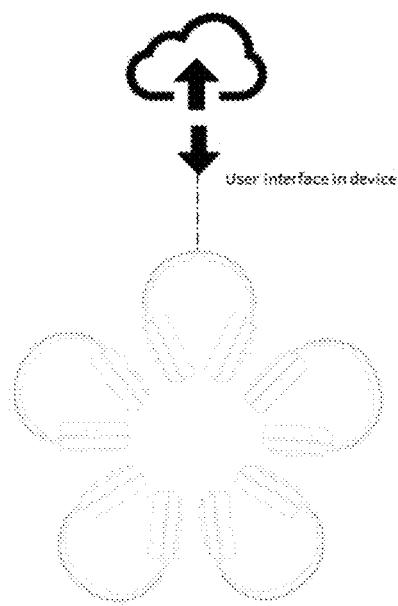
FIG. 59 illustrates a device interacting with a cloud platform with the user interface hosted on the device
Figure 60:
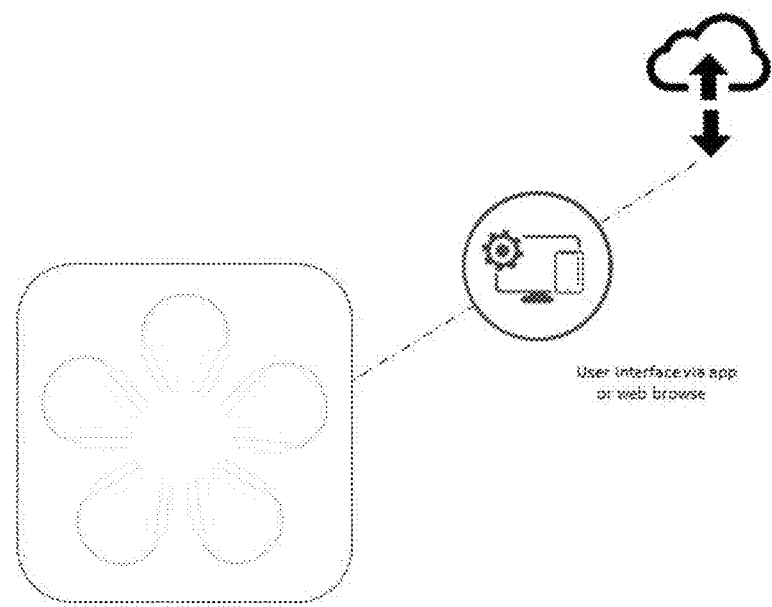
FIG. 60 illustrates a device interacting with a cloud platform via an app or web browser running on an independent device such as a phone or PC.

A device and system in which an RFID tag is not used to authorize downloading content, may have had digital content preloaded into the device prior to purchase of the device by the end user. Preloading of digital content may occur at the factory level, or digital content may be downloaded from a cloud portal through convention means of a user interface in the device or an external user interface such as a conventional app or web browser hosted on a phone or personal computer. FIG. 57 illustrates the device as a virtual reality headset having the digital content uploaded prior to purchase. FIG. 58 illustrates the device as a headphone having the digital content uploaded prior to purchase. FIG. 59 illustrates the device interacting with a cloud server with the user interface incorporated into the device. FIG. 60 illustrates the device interacting with a cloud server with the user interface hosted externally, with communication to a phone or PC by the device where the portal app or web browser is hosted. The device may obtain digital content by a hybrid of these methods, having some digital content uploaded at the factory level and other digital content downloaded from a cloud server.

In another embodiment the device may interact via a cloud server with other devices to form a wide area network to create a conventional multiplayer gaming environment.

In another embodiment the index of the device may interact with an index hosted on a cloud server wherein input to both indexes occurs in real time, and the index of the server is part of the active system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system comprising:
   an object containing a passive radio frequency identification (RFID) tag;
   a wearable device including at least one of a speaker and a display, the wearable device configured to be worn by a user and to read data from the RFID tag; and
   a cloud web portal configured to receive account information associated with a user; and
   a cloud backend configured to:
   verify that the wearable device is associated with the user account;
   confirm a purchase of digital content of the object; and
   provide digital content for downloading to the wearable device; the wearable device further configured to:
   use the RFID tag data to interact with the cloud backend to download the digital content; and
   arrange the downloaded content into an indexed collection of content elements, with an index system providing a relationship between a classification of user inputs and a content element;
   wherein the object comprises a first set of magnets and a radio frequency identification (RFID) passive tag,
   the receiving portion of the wearable device comprises a second set of magnets, an active RFID reader, and a Hall sensor, and
   when the object is received by the receiving portion of the wearable device, the first set of magnets engages the second set of magnets via a magnetic connection to affix the object to the receiving portion of the wearable device.

2. The system of claim 1, wherein:
   when the object is received by the receiving portion of the wearable device, the first set of magnets of the object activates the Hall sensor of the wearable device,
   the Hall sensor activates a read cycle of the active RFID reader in the receiving portion of the wearable device, and
   the activation of the read cycle of the active RFID reader of the receiving portion of the wearable device comprises detection of an identifier and a security code associated with digital content from the RFID passive tag of the object.

3. The system of claim 1,
   wherein the receiving portion of the wearable device comprises a light sensor comprising a photodiode and an optical sensory array comprising one or more photoelements, and
   wherein, in response to the object being received by the receiving portion of the wearable device, the light sensor of the receiving portion of the wearable device is covered by the object to trigger a handshake to detect an identifier and a security code associated with digital content of the object.

4. A method for downloading content into a wearable device, the method comprising:
   using an application running on a user computing device to create a user account on a cloud backend via a web portal;
   reading tag data of an object;
   verifying that the user computing device is associated with the user account;

confirming a purchase of digital content of the object;

using the tag data to interact with the cloud backend to download the digital content; and arranging the downloaded content into an indexed collection of content elements, with an index system providing a relationship between a classification of user inputs and a content element;

wherein the object comprises a first set of magnets and a radio frequency identification (RFID) passive tag, the receiving portion of the wearable device comprises a second set of magnets, an active RFID reader, and a Hall sensor, and when the object is received by the receiving portion of the wearable device, the first set of magnets engages the second set of magnets via a magnetic connection to affix the object to the receiving portion of the wearable device.

5. The method of claim 4, further comprising:

affixing the object to a receiving portion of a wearable device operably coupled to the user computing device; and detecting the object by the receiving portion of the wearable device.

6. The method of claim 4, wherein the content is streamed to the wearable device.

7. The method of claim 4, wherein one or more users, devices, or both interact with the digital content via a connection to the wearable device.

8. The method of claim 4, wherein:

the inputs to the indexing system originate from a wireless connection via at least one of an RFID read, a Bluetooth connection, a radio broadcast, a mesh system, an ultra-wideband connection, a Wi-Fi connection, a touch connection via galvanic or capacitive coupling by skin contact, one or more user gestures via motion sensors or audio sensors, or another mechanism, and one or more connection methods operate simultaneously.

9. The method of claim 4, wherein content elements end with a decision node that invokes the indexing system to determine the content element to be selected.

10. The method of claim 9, wherein the decision node triggers at least one of a user prompt, a waiting state from a user input, or a request for state information from a second connected device to inform the index system.

11. The method of claim 9, wherein at least one of the decision nodes is stored as a list of prompts.

12. The method of claim 9, wherein the object comprises a timer mechanism configured to control a duration of the digital content playback.

13. The method of claim 12, wherein a method to confirm the decision node comprises turning the timer mechanism such that the object is detected by a Hall sensor of the wearable device.

14. The method of claim 9, further comprising confirming the decision node includes detecting a movement of a head of the user.

15. The method of claim 4, further comprising:

receiving an input from the user that determines a next block of the digital content.

16. The method of claim 15, wherein the input from the user includes at least one of a gesture input, an audio input, a tactile input, and an absolute or relative special position input.

17. The method of claim 16, wherein the index system computes a selected content element from multiple inputs using at least one of a weighting matrix or fuzzy logic.

18. The method of claim 16, wherein the index system operates asynchronously to content playback to cause the selected content element to change at any time without a decision node.

19. The method of claim 16, further comprising the index system dynamically changing the relationship between input classifications and content elements in response to previous activity.

* * * * *